US010891678B1

(12) United States Patent
Muralidharan et al.

(10) Patent No.: US 10,891,678 B1
(45) Date of Patent: Jan. 12, 2021

(54) PERSONALIZED NETWORK CONTENT GENERATION AND REDIRECTION ACCORDING TO TIME INTERVALS BETWEEN REPEATED INSTANCES OF BEHAVIOR BASED ON ENTITY SIZE

(71) Applicant: Amazon Technologies, Inc., Seattle, WA (US)

(72) Inventors: Srevatsan Muralidharan, Seattle, WA (US); Rahul Hemant Bhagat, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 695 days.

(21) Appl. No.: 15/490,523

(22) Filed: Apr. 18, 2017

(51) Int. Cl.
  *G06Q 30/00* (2012.01)
  *G06Q 30/06* (2012.01)
  *G06F 7/02* (2006.01)

(52) U.S. Cl.
  CPC ......... *G06Q 30/0631* (2013.01); *G06F 7/026* (2013.01); *G06Q 30/0625* (2013.01)

(58) Field of Classification Search
  CPC ............... G06Q 30/02; G06Q 30/0201; G06Q 30/0625; G06Q 30/0631; G06Q 30/0255; G06Q 30/06
  USPC ...................................................... 705/26, 27
  See application file for complete search history.

(56) References Cited

U.S. PATENT DOCUMENTS

| | | | |
|---|---|---|---|
| 7,406,436 B1 | 7/2008 | Reisman | |
| 7,594,189 B1 | 9/2009 | Walker et al. | |
| 7,720,720 B1 | 5/2010 | Sharma et al. | |
| 8,838,583 B1 | 9/2014 | Fox | |
| 9,519,867 B1* | 12/2016 | Reeves | G06F 16/21 |
| 9,792,382 B2* | 10/2017 | Sadri | G06Q 30/0278 |
| 2001/0049690 A1 | 12/2001 | McConnell et al. | |
| 2005/0033803 A1 | 2/2005 | Van et al. | |
| 2010/0049538 A1* | 2/2010 | Frazer | G06Q 30/02 705/14.4 |
| 2010/0191582 A1 | 7/2010 | Dicker et al. | |
| 2013/0262216 A1* | 10/2013 | Zhang | G06Q 30/02 705/14.36 |
| 2013/0339126 A1 | 12/2013 | Cui et al. | |

(Continued)

OTHER PUBLICATIONS

Choi, Yoon Kyoung, An Auxiliary Recommendation System for Repetitively Purchasing Items in E-Commerce, IEEE Xplore, 3pgs (Year: 2014).*

(Continued)

*Primary Examiner* — Robert M Pond
(74) *Attorney, Agent, or Firm* — Thomas Horstemeyer, LLP

(57) ABSTRACT

Disclosed are various embodiments for personalized network content generation and redirection according to time intervals between repeated instances of behavior. A computing device determines an expectation of a specific entity repeating a behavior associated with an item based at least in part on a time interval between prior occurrences of the behavior by the specific entity. The computing device then selects the item from a plurality of items based at least in part on the expectation of the specific entity repeating the behavior. Subsequently, the computing device generates a network page including a recommendation to repeat the behavior. Next, the computing device sends the network page to a client device associated with the specific entity.

19 Claims, 12 Drawing Sheets

(56) References Cited

U.S. PATENT DOCUMENTS

| | | | |
|---|---|---|---|
| 2014/0279208 A1* | 9/2014 | Nickitas | G06Q 30/0631 |
| | | | 705/26.7 |
| 2014/0279995 A1 | 9/2014 | Wang et al. | |
| 2014/0324521 A1* | 10/2014 | Mun | G06Q 10/06393 |
| | | | 705/7.28 |
| 2015/0006314 A1 | 1/2015 | Goulart et al. | |
| 2015/0254365 A1* | 9/2015 | Sadri | G06Q 30/0278 |
| | | | 707/769 |
| 2015/0332336 A1* | 11/2015 | Hong | G06Q 50/01 |
| | | | 705/14.66 |
| 2016/0019581 A1* | 1/2016 | Wu | G06Q 30/0269 |
| | | | 705/14.43 |
| 2016/0019595 A1* | 1/2016 | Wu | G06Q 30/0251 |
| | | | 705/14.66 |
| 2016/0162974 A1 | 6/2016 | Lee et al. | |
| 2016/0232575 A1* | 8/2016 | Kirti | G06Q 30/0269 |
| 2016/0275530 A1* | 9/2016 | Concannon | G06Q 10/087 |
| 2017/0024424 A1 | 1/2017 | Almohizea | |
| 2017/0140416 A1* | 5/2017 | Ye | G06Q 30/0243 |

OTHER PUBLICATIONS

Choi, Yoon Kyoung, An Auxiliary Recommendation System for Repetitively Purchasing Items in E-commerce, Jan. 1, 2014, 2014 International Conference on Big Data and Smart Computing, pp. 96-98 (Year: 2014).

U.S. Appl. No. 14/939,525, filed Nov. 12, 2015, Notice of Allowance dated Jan. 24, 2019.

U.S. Appl. No. 15/490,419, filed Apr. 18, 2017, Non-Final Office Action dated Jun. 21, 2019.

U.S. Appl. No. 14/939,525, filed Nov. 21, 2015, Non-Final Office Action dated Jul. 11, 2018.

U.S. Appl. No. 14/939,525, filed Nov. 12, 2015, Response to Restriction/Election dated Mar. 15, 2018.

U.S. Appl. No. 14/939,525, filed Nov. 12, 2015, Restriction/Election dated Mar. 15, 2018.

U.S. Appl. No. 15/490,419, filed Apr. 18, 2017, Final Office Action dated Nov. 22, 2019.

* cited by examiner

PERSONALIZED NETWORK CONTENT GENERATION AND REDIRECTION ACCORDING TO TIME INTERVALS BETWEEN REPEATED INSTANCES OF BEHAVIOR BASED ON ENTITY SIZE

BACKGROUND

An electronic marketplace may include listings of items offered for sale, lease, download, rent, etc., by many different entities. Users may use the electronic marketplace to purchase, lease, download, rent, etc., items of interest. In some instances, users may repeat behavior with respect to particular items of interest.

CROSSREFERENCE TO RELATED APPLICATIONS

This application is related to copending U.S. patent application Ser. No. 14/939,525, filed on Nov. 12, 2015, and entitled "PERSONALIZED NETWORK CONTENT GENERATION AND REDIRECTION ACCORDING TO REPEAT BEHAVIOR", which is incorporated by reference as if set forth herein in its entirety. This application is further related to copending U.S. patent application Ser. No. 15/490,419, filed on even date herewith and entitled "PERSONALIZED NETWORK CONTENT GENERATION AND REDIRECTION ACCORDING TO TIME INTERVALS BETWEEN REPEATED INSTANCES OF BEHAVIOR," which is incorporated by reference as if set forth herein in its entirety.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining an expectation of repeat behavior by an entity (e.g., a user, a customer, etc.) with respect to a particular item. In addition, the present disclosure relates to generating personalized recommendations for items based at least in part on the expectation of repeat behavior. These personalized recommendations may be presented within network content provided to a client device as part of a network page. The network content can include an item detail page, a shopping cart page or user interface element with item automatically included in shopping cart, a dialog box requesting confirmation to order item, a widget or other portion of a page that prompts a user to purchase the item again, or other similar types of content. Further, the present disclosure relates to redirecting entities requesting search results in response to a search query to alternative network content (e.g., an item detail page, a shopping cart page with item automatically included in shopping cart, a dialog box requesting confirmation to order item, etc.) instead of a search results page. The determination to redirect may be based at least in part on the expectation of repeat behavior by the entity with respect to a particular item, interaction history, profile data, marketing/advertising contracts, specificity of the search query, and so on.

In some embodiments, an expectation of repeat behavior by an entity with respect to a particular item may be determined. For example, an entity may be a customer of an electronic marketplace through which one or more items may be purchased, leased, downloaded, rented, etc. Purchasing history for the particular entity (e.g., a customer of an electronic marketplace) may indicate that the customer has purchased a particular item multiple times. This information not only indicates an interest in the item, but also may be used to determine an expectation of repeat behavior (e.g., actual purchase of the item) after a given time period has elapsed (e.g., a customer reorders shampoo every 3-4 weeks).

According to various embodiments, the expectation of repeat behavior may be determined by using one or more repeat behavior models. The repeat behavior models may be based on a Log-Normal distribution, a Beta distribution, and/or other appropriate models for modeling the repeat behavior of entities with respect to a particular item. The repeat behavior models may use information (e.g., date(s) of behavior, mean interval of time between occurrences of the behavior, etc.) of a particular entity and/or other entities whose behavior also indicates a repeat behavior associated with a particular item.

Figure 1:
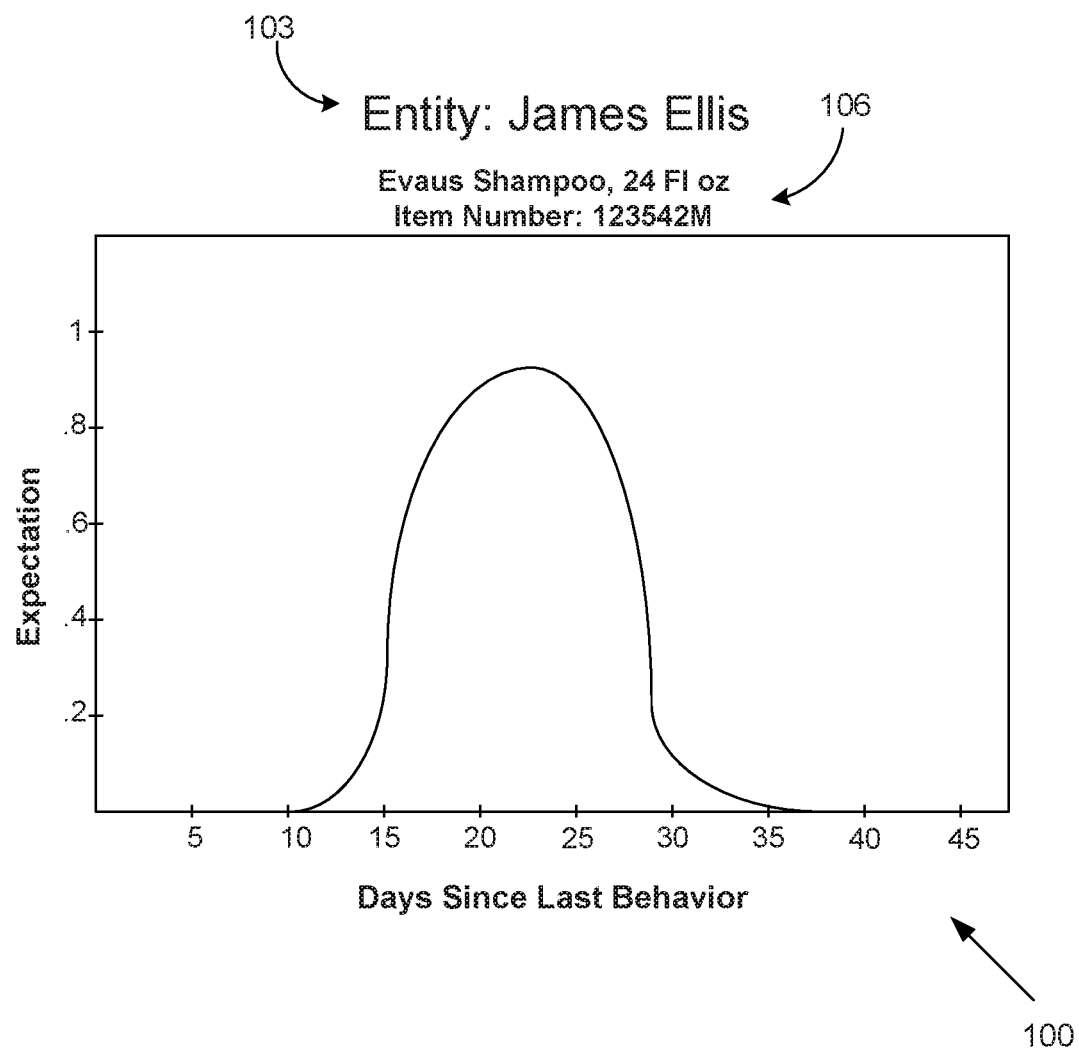
FIG. 1 is a graphical representation of an example of an expectation of repeat behavior by an entity with respect to an item according to various embodiments of the present disclosure.

FIG. 1 illustrates a graphical representation of an example of an expectation of repeated behavior by entity 103 ("James Ellis") with respect to a repeat purchase of item 106 ("Evaus Shampoo, 24 Fl. oz."). For example, FIG. 1 illustrates the expectation rising after the day of the last order until it reaches its peak height for repeated behavior. Once the expectation reaches its peak height, the expectation begins to gradually fall. Accordingly, in this particular example, the entity 103 is most likely to repeat his or her behavior twenty to twenty-five days after the prior purchase.

In other embodiments, the expectation of repeat behavior can be used as a factor in determining whether to generate a recommendation for an entity 103 with respect to an item 106. In some embodiments, a recommendation may be generated for the item 106 and sent to the entity 103 during a time period that the expectation of repeat behavior associated with the item 106 meets or exceeds a predefined threshold. For example, in the example of FIG. 1, assume that the entity 103 interacts with the electronic marketplace offering the item 106 "Evaus Shampoo" for purchase twenty-four days after a prior purchase of the item 106. Further, assume that the expectation of repeat behavior for that date meets or exceeds a predefined threshold. Accordingly, a network page including a recommendation of the item 106 may be generated and sent to the client device associated with the entity 103. The network page may comprise any network page associated with the electronic marketplace such as, for example, a recommendation page, a check-out page, a shopping cart page, an item detail page, a search results page, an electronic marketplace home page, and/or other type of network page associated with the electronic marketplace. The recommendation may include selectable components configured to facilitate repetition of the behavior by the entity 103 for the particular item 106 (e.g., facilitate purchase of the item 106 via the electronic marketplace, etc.). In other embodiments, the recommendation may be included in an electronic message such as, for example, an email message, an instant message, a mobile device notification, a social media notification, and/or other type of message that may be received within a computing device.

In other embodiments, an entity 103 may request search results for a particular search query. In some embodiments, various factors, such as the expectation of repeat behavior by the entity 103 with respect to a particular item 106, interaction history, profile data, marketing/advertising contracts, etc., may be evaluated with respect to the search query and/or the search results. Based on the evaluation of the factors, the entity 103 may be redirected to an alternative network page (e.g., an item detail page, a shopping cart page with the item 106 automatically included in shopping cart, a dialog box requesting confirmation to order the item 106, etc.) for a particular item 106 instead of being directed to a search results page listing the search results for a particular item 106.

In one non-limiting example, assume that the entity 103 searches for "paper towels." The search results may include a listing of different brands of paper towels. However, the user profile data may indicate that the entity 103 has an interest in a particular brand of paper towels based at least in part on an entity 103's interaction history (e.g., purchasing history, browsing history, ratings history, etc.). For example, the entity 103 may have rated a particular brand of paper towels highly and/or previously purchased the particular brand of paper towels.

In some embodiments, a score may be generated with respect to weighted values assigned to each of the factors. If the score meets or exceeds a predefined threshold, the entity 103 may be automatically redirected to an item detail page associated with the particular brand of paper towels rather than to a search results page including a listing of different brands of paper towels. The item detail page may include a search results component that when selected would redirect the entity 103 to the initially requested search results page. In some embodiments, the item 106 may be automatically added to a shopping cart, and the entity 103 may be redirected to a shopping cart network page indicating that the item 106 has been added to the shopping cart for ordering. The entity 103 may be requested to confirm/deny the addition of the item 106 and/or may be presented with an option to view the originally requested search results.

In some embodiments, a vendor of a particular item 106 may request that any time a search query is received that is associated with the particular item 106, the requesting entity 103 may be automatically redirected to the item detail page of the particular item 106. For example, assume that the vendor offers a type of cooler for sale via the electronic marketplace. Further, assume that the vendor may have a contract with the electronic marketplace such that in response to receiving a search query for "cooler," the electronic marketplace automatically redirects the requesting entity 103 to an item detail page of the cooler offered for sale by the vendor instead of the typical, relevance-based search results associated with the search query. The item detail page may include a search results component that when selected would redirect the entity 103 to the initially requested search results page.

Figure 2:
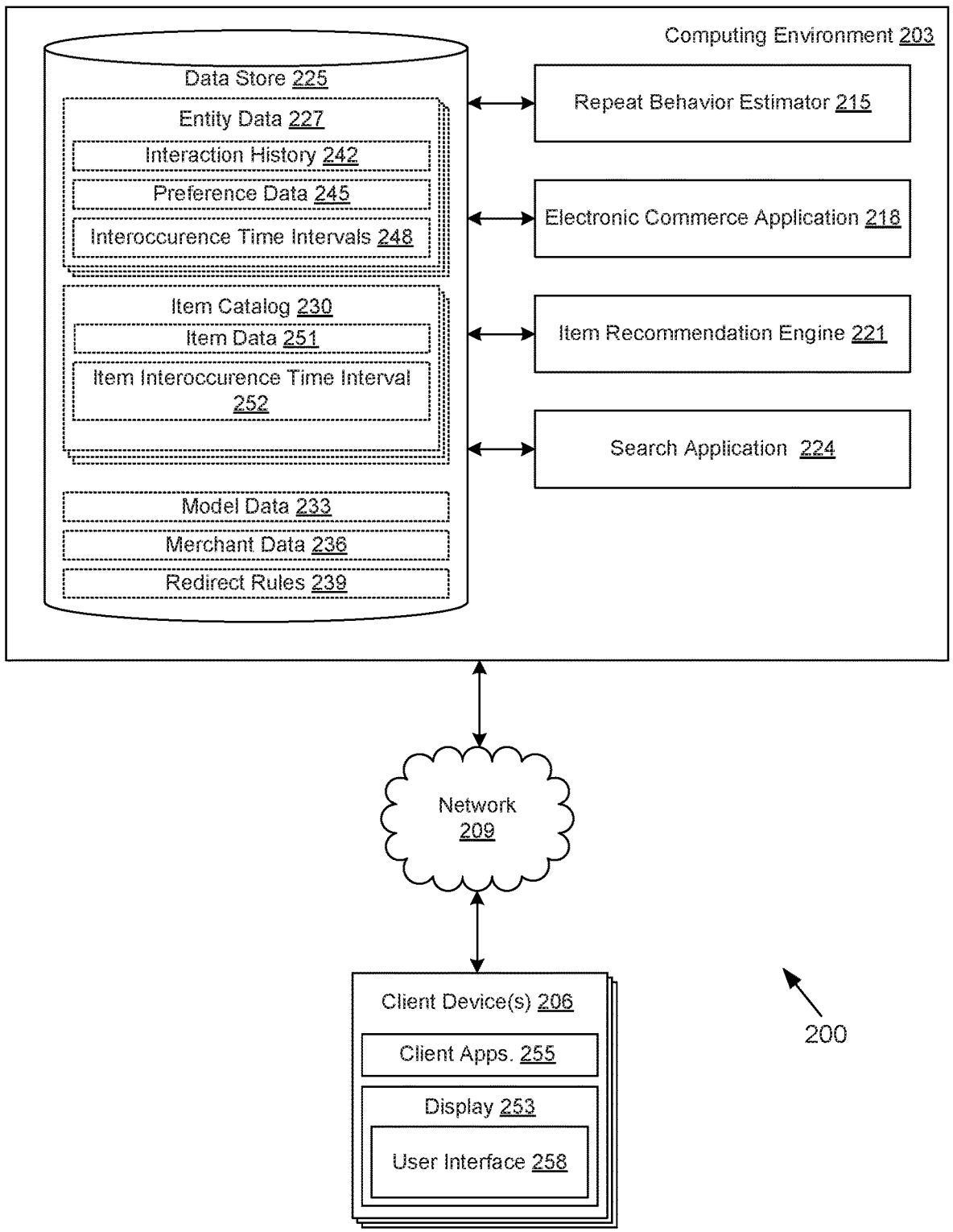
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a repeat behavior estimator 215, an electronic commerce application 218, an item recommendation engine 221, a search application 224, and other applications, services, processes, systems, engines, or functionality not discussed in detail herein.

The repeat behavior estimator 215 is executed to determine an expectation of repeat behavior by entities 103 with respect to a particular item 106. To this end, the repeat behavior estimator 215 analyzes various behavior data collected regarding one or more entities 103 and applies the data to one or more types of prediction models to determine an expectation of repeat behavior. In some embodiments, the repeat behavior estimator 215 may learn from additional behavior and re-evaluate the expectation of repeated behavior periodically and/or randomly. For example, via machine learning approaches, additional behavior may be used to update and/or improve the accuracy of the predictions by the repeat behavior model.

The electronic commerce application 218 is executed in order to facilitate the online purchase, rental, or acquisition of items 106 from one or more electronic marketplaces over the network 209. Such items 106 may include products, goods, services, digital content, and/or other items 106. The electronic commerce application 218 also performs various backend functions associated with the online presence of an electronic marketplace in order to facilitate the online purchase of items 106. For example, the electronic commerce application 218 generates network pages such as, for example, web pages and/or other types of network content that are provided to client devices 206 for the purposes of promoting and selecting items 106 for purchase, rental, download, lease, or any other forms of consumption.

The item recommendation engine 221 is executed to generate one or more personalized recommendations of an item 106 offered for sale, lease, rent, download, etc., via one or more electronic marketplaces. To this end, the item recommendation engine 221 may analyze various behavioral data collected regarding an entity 103 and select one or more items 106 to recommend based at least in part on the analysis. In some embodiments, the item recommendation engine 221 may generate a recommendation based at least in part on an expectation of repeat behavior by the entity 103 with respect to a particular item 106. In some embodiments, the item recommendation engine 221 may evaluate one or more factors (e.g., interaction history, expectation of repeat behavior, etc.) for multiple items 106 and generate a score for each item 106 based at least in part on the one or more factors. To this end, the item recommendation engine 221 may rank the items 106 based at least in part on the score and select one or more items 106 according to the ranking. The item recommendation engine 221 may generate one or more personalized recommendations for the items 106.

The search application 224 may be executed in response to receiving a search query via network content associated with electronic commerce application 218. In some embodiments, the search application 224 may generate search results associated with the search query. In other embodiments, the search application 224 may retrieve cached search results that were previously generated for the same and/or similar search query. In some embodiments, the search application 224 may evaluate one or more factors (e.g., an expectation of repeat behavior by the entity 103 with respect to a particular item 106, interaction history, profile data, marketing/advertising contracts, etc.) to determine whether to automatically redirect an entity 103 interacting with an electronic commerce application 218 to an item detail page associated with a particular item 106 instead of a search results page that lists the search results for a given search query.

Also, various data is stored in a data store 225 that is accessible to the computing environment 203. The data store 225 may be representative of a plurality of data stores 225, which can include relational databases, object-oriented databases, hierarchical databases, hash tables or similar key-value data stores, as well as other data storage applications or data structures. The data stored in the data store 225 is associated with the operation of the various applications or functional entities 103 described below. This data can include entity data 227, an item catalog 230, model data 233, merchant data 236, redirect rules 239, and potentially other data.

The entity data 227 may include various information collected from or generated regarding entities 103 (e.g., a user, a customer, etc.) interacting with the electronic commerce application 218. The entity data 227 may include interaction history 242, preference data 245, an interoccurence time interval 248, and/or other information. The interaction history 242 may include information specific to an entity 103 such as, for example, a purchase history, a browsing history, a viewing history, a rating history, and/or other information that reflects a prior interaction of the entity 103 with the computing environment 203. The preference data 245 may include information related to preferences of items 106, brands of items 106, quantity of items 106, and/or other information. The interoccurence time interval 248 may represent an average time interval that elapsed between occurrences of a behavior (e.g., time between purchases) by the particular entity 103 for a particular item 106, a set of time intervals representing the time that elapsed between subsequent instances of a behavior, or similar data.

The item catalog 230 includes data regarding items 106 offered for order through the electronic commerce application 218. Such items 106 may include products, goods, services, digital content, and/or other items 106. The item catalog 230 may include item 106 data 251, item interoccurence time interval 252, and/or other information. The item 106 data 251 may include titles, descriptions, weights, prices, quantities available, export restrictions, customer reviews, customer ratings, images, videos, version information, availability information, shipping information, and/or other data. The item interoccurence time interval 252 can include, in some instances, the mean and/or average length of time between repeated instances or occurrences of a repeat behavior for a particular item 106 that is based at least in part on a rate of repurchase by entities 103 who have exhibited a repeat behavior with respect to the particular item 106. The item interoccurence time interval 252 can also include, in some instances, the set of time intervals between a corresponding set of occurrences of the repeat behavior.

The model data 233 includes information regarding one or more behavior models that the repeat behavior estimator 215 may employ in determining the expectation of repeat behavior. The model data 233 may include repeat behavior models such as, for example, a Bayesian Log-Normal model, a Gaussian mixture model, and/or other appropriate models for modeling the repeat behavior of entities 103 with respect to a particular item 106. Embodiments that use the Bayesian Log-Normal model may model various parameters of a Log-Normal distribution fitted to the item interoccurence time interval 252 or the interoccurence time interval 248 of an entity 103 using a beta distribution. Likewise, embodiments that use the Gaussian mixture model may model various parameters as a collection of Log-Normal distributions fitted to one or more interoccurence time intervals 252 or the interoccurence time intervals 248 of an entity 103.

The merchant data 236 includes various data relating to merchants who have offered items 106 for ordering through an electronic marketplace. The merchant data 236 may include, for example, data relating to advertising agreements, purchasing agreements, purchase orders, inventory data, order data, customer data, and/or other data. For example, the merchant data 236 may include specific advertising agreements that dictate whether in response to a particular search query, an entity 103 is to be redirected to an alternative network page associated with an item 106 offered by the merchant instead of providing a search results listing to the entity 103.

The redirect rules 239 may include one or more rules related to whether an alternative network page associated with an item 106 should be sent to an entity 103 instead of a search results page in response to receiving a search query. In some embodiments, the redirect rules 239 may include thresholds related to expectation of repeat behavior, scores associated with a level of interest in the item 106 based at least in part on interaction history, and/or other information. For example, the redirect rules 239 may include a threshold level for the expectation of repeat behavior such that if the expectation of repeat behavior by the entity 103 with respect to the item 106 meets or exceeds a predefined threshold, the entity 103 will be redirected to an alternative network page associated with the item 106 rather than the originally requested search results page. In another embodiment, various factors (e.g., interaction history, preference data, expectation of repeat behavior, etc.) may be assigned a weight, and the sum of weighted values may be compared to a predefined threshold to determine whether the entity 103 should be redirected to an alternative network page associated with the item 106 instead of the originally requested search results page. In another non-limiting example, the redirect rules 239 may include rules related to advertising agreements for particular merchants as reflected in the merchant data 236.

The client device 206 is representative of a plurality of client devices that may be coupled to the network 209. The client device 206 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 may include one or more displays 253, such as liquid crystal displays (LCDs), gas plasma-based flat panel displays, organic light emitting diode (OLED) displays, electrophoretic ink ("E-ink") displays, projectors, or other types of display devices. In some instances, the display 253 may be a component of the client device 206 or may be connected to the client device 206 through a wired or wireless connection.

The client device 206 may be configured to execute various applications such as a client application 255 or other applications. The client application 255 may be executed in a client device 206, for example, to access network content served up by the computing environment 203 or other servers, thereby rendering a user interface 258 on the display 253. To this end, the client application 255 may include, for example, a browser, a dedicated application, or other executable, and the user interface 258 may include a network page, an application screen, or other user mechanism for obtaining user input. The client device 206 may be configured to execute applications beyond the client application 255 such as, for example, email applications, social networking applications, word processors, spreadsheets, or other applications.

Next, a general description of the operation of the various components of the networked environment 200 is provided. To begin, the electronic commerce application 218 may monitor interactions by entities 103 with network content provided by the electronic commerce application 218. The interactions may provide information about entity 103 behavior with respect to items 106 offered for ordering via the electronic commerce application 218. The entity 103 behavior may be collected and stored in association with the entity data 227. The repeat behavior estimator 215 may use the entity 103 behavior associated with a large set of entities 103 to establish the models used to determine an expectation of repeat behavior by an entity 103 of a particular item 106.

After a sufficient amount of entity 103 behavior has been collected and stored in association with the entity data 227 for a plurality of entities 103, the likelihood that any particular behavior will be repeated can be modeled. For example, the likelihood or probability that if an arbitrary customer would buy an item 106, the customer would buy it within an interoccurence time interval 248 "t" can be modeled as a Log-Normal Distribution prior probability P (t|buy=1) with parameters $\mu_p$ and $\sigma_p$. For any given item 106, the Log-Normal Distribution may be fitted to the item interoccurence time interval 252 to obtain an estimate for $\mu_p$ and $\sigma_p$. Further, the likelihood P (t|customer=$C_i$), which is the likelihood or probability that an entity 103 will repeat a behavior (e.g., a customer will repurchase an item 106) within the interoccurence time interval 248 for a particular item 106, can be modeled as a Log-Normal Distribution with the parameters $\mu_c$ and $\sigma_c$, if an entity 103 has engaged in the behavior (e.g., purchased the item 106) more than twice. For entities 103 that have engaged in a behavior two or fewer times, the prior probability P can be used to estimate the likelihood or probability that an entity 103 will repeat a behavior within a given period of time. For entities 103 that have engaged in a behavior on more than two occasions, an entity 103 specific estimate of the probability that the entity 103 will repeat the behavior within a given period of time can be modeled in a Bayesian fashion as a Log-Normal Distribution with parameters:

$$\mu = \frac{\sigma_c^2 \mu_p + \eta \sigma_p^2 \mu_c}{\sigma_c^2 + \eta \sigma_p^2}, \sigma = \frac{\sigma_c^2 \sigma_p^2}{\sigma_c^2 + \eta \sigma_p^2} \quad (1)$$

Subsequently, the repeat entity 103 behavior (REB) factor, which represents the probability that an entity 103 would repeat a behavior for the $(n+1)^{th}$ time (e.g., purchase an item 106 again), given that the entity 103 engaged in the behavior on n-previous occasions, is determined. In some embodiments, the REB may be determined using the following equation:

$$REB = \frac{\text{\# of entities that exhibited a repeat instance of a behavior}}{\text{\# of entities who exhibited at least one instance of the behavior}} \quad (2)$$

In some embodiments, the REB may further be modeled as a Beta distribution.

Modeling the REB factor as a Beta distribution allows for encoding the amount of uncertainty present in the estimated value in a Bayesian fashion. The parameters of the Beta distribution can be estimated by looking at the global aggregate counts of the number of entities 103 that engaged in a behavior n-times that also subsequently engaged in the behavior in an $(n+1)^{th}$ time. These global aggregates may be derived from the entity data 227 for each entity 103, such as the interaction history 242 of each entity 103 and the interoccurence time intervals 248 for each entity 103.

The final probability that an entity 103 will engage in a behavior again within a particular period of time subsequent to the last occurrence of the entity 103 engaging in the behavior by multiplying the results of Equation (1) by the REB factor. It should be noted that since the expectation of repeat behavior is dependent upon the behavior of the entity 103 as well as other entities 103 exhibiting repeat behavior with respect to a particular item 106, the variables and the interoccurence time intervals 248 may change over time. Accordingly, in some embodiments, the repeat behavior estimator 215 may periodically, randomly, and/or intermittently update the model data 233 and update the expectation of repeat behavior based at least in part on the changed variables.

However, an alternative model may be used in some circumstances. For example, the previously described model of the likelihood that an entity 103 will repeat a behavior relies on an assumption that all entities 103 are the same or substantially similar. For example, if modeling the likelihood that a customer is likely to repeat a purchase based at least in part on an elapsed period of time from a prior purchase, the previously described model may assume that all customers represent a single user or a household or company of uniform size. However, this is not always the case, as different entities 103 may be different sizes (e.g., different numbers of employees or different household compositions). Moreover, the size of an entity may affect how quickly an entity 103 is likely to repeat a behavior. For example, large households or companies may reorder consumable goods more quickly than individuals.

In the alternative model, the interoccurence time intervals 248 for individual entities can be modeled as a Gaussian mixture model. The Gaussian mixture model represents a Bayesian approach that accounts for the presence of a mixture of different subpopulations (e.g., entities 103 of different sizes) within the set of all interoccurence time intervals 248 across all entity data 227 records. Accordingly, the Gaussian mixture model can correspond to a collection of Log-Normal Distributions, with each Log-Normal Distribution in the collection of Log-Normal Distributions representing a specific subpopulation of entities 103. As a result, the probability that an entity 103 belongs to a specific segment needs to be estimated as well as the parameters $\mu_p$ and $\sigma_p$ for the Log-Normal Distribution for each segment. In embodiments that use the Gaussian mixture model, these parameters are $(\mu_p^i, \sigma_p^i, \pi^i)$ for $i \in [1,N]$, where $(\mu_p^i, \sigma_p^i)$ are the mean and the standard deviation of the Log-Normal Distribution model associated with the $i^{th}$ segment in set of N segments, and $\pi^i$ is the prior probability of a random entity 103 belonging to the segment i. One approach that can be used for estimating the parameters of the Gaussian mixture model is an Expectation-Maximization approach.

The posterior probability that an entity 103 belongs to segment i, denoted by $\pi_{pos}^i$, given the set of interoccurrence time intervals 248 $t_1, t_2, t_3$, etc., stored in the entity data 227 associated with the entity 103, can be modeled in a Bayesian fashion. For example, the following equation could be used:

$$\pi_{pos}^i = P(\text{Entity} = i \mid t_1 \ldots t_k) \approx \frac{1}{K} \sum_{j=1}^{K} P(\text{Entity} = i \mid t_j) = \quad (3)$$

$$\frac{1}{K} \sum_{j=1}^{K} \frac{P(t_j \mid \text{Entity} = i)}{\sum_{m=1}^{N} P(t_j \mid \text{Entity} = m)}$$

To generate a customized distribution depending on the above computed probabilities, the weighted sum of the N Log-Normal Distributions specified by $(\mu_p^i, \sigma_p^i)$ with weights $\pi_{pos}^i$ can be used. As a result, the prior Log-Normal Distribution that is customized with regards to the segment in which an entity 103 belongs can be obtained. The probability that an entity 103 will repeat a given behavior can then be predicted based on the obtained Log-Normal distribution using the previously described approaches discussed with respect to equations (1) and (2).

The item recommendation engine 221 generates recommendations to present to entities 103 interacting with network pages associated with the electronic commerce application 218. In some embodiments, the item recommendation engine 221 may select a particular item 106 to recommend based at least in part on the expectation of repeat behavior by the entity 103 for the particular item 106. The item recommendation engine 221 may request the repeat behavior estimator 215 to recalculate the expectation or repeat behavior. In other embodiments, the item recommendation engine 221 may access stored data of predetermined expectation of repeat behavior values for the entity 103 with regard to a particular item 106.

In one non-limiting example, the item recommendation engine 221 may analyze the item catalog 230 and rank at least a subset of items 106 from the item catalog 230 according to an expectation of repeat behavior by the entity 103 for the at least a subset of items 106. The item recommendation engine 221 may select one or more items 106 to generate a recommendation according to a highest ranked item 106, a predefined percentage and/or quantity of the highest ranked items 106, and so on. In some embodiments, the item recommendation engine 221 may select a percentage and/or quantity of items 106 that have a corresponding expectation of repeat behavior exceeding a predefined threshold.

In other embodiments, the item recommendation engine 221 may use the expectation of repeat behavior as one of a plurality of factors to select an item 106 for which a recommendation is to be generated. The factors that may be considered by the item recommendation engine 221 may include, for example, the expectation of repeat behavior, the preference data 245, interaction history 242, type of item 106, average rate of repeat behavior among all entities 103, number of entities 103 that exhibit repeat behavior associated with the item 106, price of item 106, item 106 category, behavior associated with prior recommendations of the item 106 presented to the entity 103, and so on.

In some embodiments, the item recommendation engine 221 assigns a score to one or more items 106 in at least a subset of the item catalog 230 based at least in part on each of the factors. For example, the score may be based at least in part on the number of factors that meet or exceed certain threshold values. In other non-limiting examples, some factors may be assigned weighted values reflecting a level of emphasis or non-emphasis for that particular factor. For example, the item recommendation engine 221 may learn over time using machine learning techniques that recommendations for items 106 associated with kitchen products are more likely to generate positive behavior than recommendations for items 106 associated with office products. As such, the item 106 category factor for a kitchen item 106 may have a higher value than the item 106 category factor for an office item 106. The item recommendations engine 221 may select one or more items 106 based at least in part on the score.

In some embodiments, the item recommendations engine 221 selects one or more items 106 based at least in part on a ranking of the scores (e.g., highest ranked, predefined percentage/quantity of highest ranked, etc.). In other embodiments, the item recommendation engine 221 may select one or more items 106 if the respective scores meet or exceed a particular threshold.

In some embodiments, the item recommendation engine 221 may interact with the electronic commerce application 218 with respect to generating network content with recommendations that can be provided by the electronic commerce application 218 to client devices 206 interacting with the electronic commerce application 218. For example, if the electronic commerce application 218 receives a request for a recommendation network page that includes recommendations for items 106 that can be ordered through the electronic commerce application 218, the electronic commerce application 218 may request the item recommendation engine 221 to generate and provide a recommendation network page that is personalized for a particular entity 103. In a similar example, if the electronic commerce application 218 receives a request for a network page, the electronic commerce application 218 may request that the item recommendation engine 221 generate and provide a list of items recommended for purchase that is customized for the particular entity 103. The electronic commerce application 218 could then incorporate the list of recommended items within the network page that it generates. For example, the list of recommended items could be included in a section of the network page or a widget displayed on the network page that presents recommendations of items to the user for purchase. This section or widget could be presented as a list of recommendations or as a prompt to ask the entity 103 if it wishes to purchase one or more of the items 106 again.

According to other embodiments of the present disclosure, the electronic commerce application 218 may send network content to a client device 206 that includes a search query component (e.g., text box, audio input, etc.) configured to receive a search query. In response to receiving a search query from the client device 206, the electronic commerce application 218 may request the search application 224 to perform a search based on the search query and generate search results and/or retrieve cached search results according to the search query. In some embodiments, the search results may include a list of items 106 from the item catalog 230. In response to receiving a request from the electronic commerce application 218, the search application 224 may analyze the search query and perform a search in accordance to the search query. In some embodiments, the search application 224 may generate network content comprising the search results and provide the network content to the electronic commerce application 218. The network content may be sent by the electronic commerce application 218 to the client device 206.

In other embodiments, the search application 224 may determine that the entity 103 should be redirected to alternative network content (e.g., item detail page, shopping cart page with item 106 automatically included in shopping cart, dialog box requesting confirmation to order item 106, etc.) associated with a particular item 106 instead of network content comprising the originally requested search results (e.g., search results page). In particular, the search application 224 may be able to predict the particular result (e.g., item 106) in which the entity 103 is interested based at least in part on the search query and/or a variety of other factors. The factors may include, for example, a past repeated behavior by the entity 103 with respect to an item 106, preference data 245, interaction history 242, specificity of the search query (e.g., brand name of item 106 included), relationship to prior purchases, and so on. For example, if the interaction history 242 includes a prior purchase of a printer and the search query is for "printer ink," the search application 224 may predict that the entity 103 is interested in ink cartridges that are compatible with the printer that was previously purchased assuming that the search query has occurred within an expected period of time for a user to purchase new cartridges for the printer.

In some embodiments of the present disclosure, the electronic commerce application 218 may be configured to send recommendations to entities 103. For example, the electronic commerce application 218 may be configured to send an email, short message service (SMS) message, or other notification to an entity 103. This notification can include recommendations of items 106 that the entity 103 may be interested in renting, purchasing, or otherwise acquiring. Accordingly, the electronic commerce application 218 may send a request to the item recommendation engine 221 for a list of items 106 that the entity 103 might be interested in acquiring. As previously described, items 106 may be included in the list based on how recently the entity 103 previously acquired one of the items 106, as well as other factors.

The factors may be evaluated in order to determine a level of confidence regarding whether a particular item 106 is the desired result of the entity 103 requesting search results. For example, the factors may be assigned a score based at least in part on a sum of weighted values. If the score meets or exceeds a predefined threshold, the search application 224 may determine to redirect the entity 103 to the alternative network content rather than the network content including the search results. In some embodiments, the search application 224 may generate a hybrid search detail page such that one portion of the network content includes an item detail content associated with a particular item 106 and another portion of the network content includes at least a subset of the search results.

In other embodiments, the search application 224 may determine that alternative network content associated with a particular item 106 should be generated in response to a search query instead of network content comprising the search results based at least in part on a contractual agreement between a merchant and/or vendor associated with the item 106 and the electronic marketplace. For example, the merchant data 236 and/or the redirect rules 239 may indicate that if a certain search query is received (e.g. "paper towels"), an alternative network page that includes content associated with an item 106 of the merchant should be provided instead of search results corresponding to the search query. In some embodiments, the search results page may be provided, but the order of the search results may be modified to reflect the contractual agreement between the merchant and electronic marketplace.

Regardless of the reason for redirection to alternative network content instead of network content including search results in response to receiving a search query, the electronic commerce application 218 may generate alternative network content that includes a selectable component (e.g., link, button, image, etc.) that, when selected, sends a request to the electronic commerce application 218 for the originally requested search results. The alternative network content may also include information related to the reason for redirecting the entity 103 to the alternative network content instead of the originally requested search results.

Figure 3:
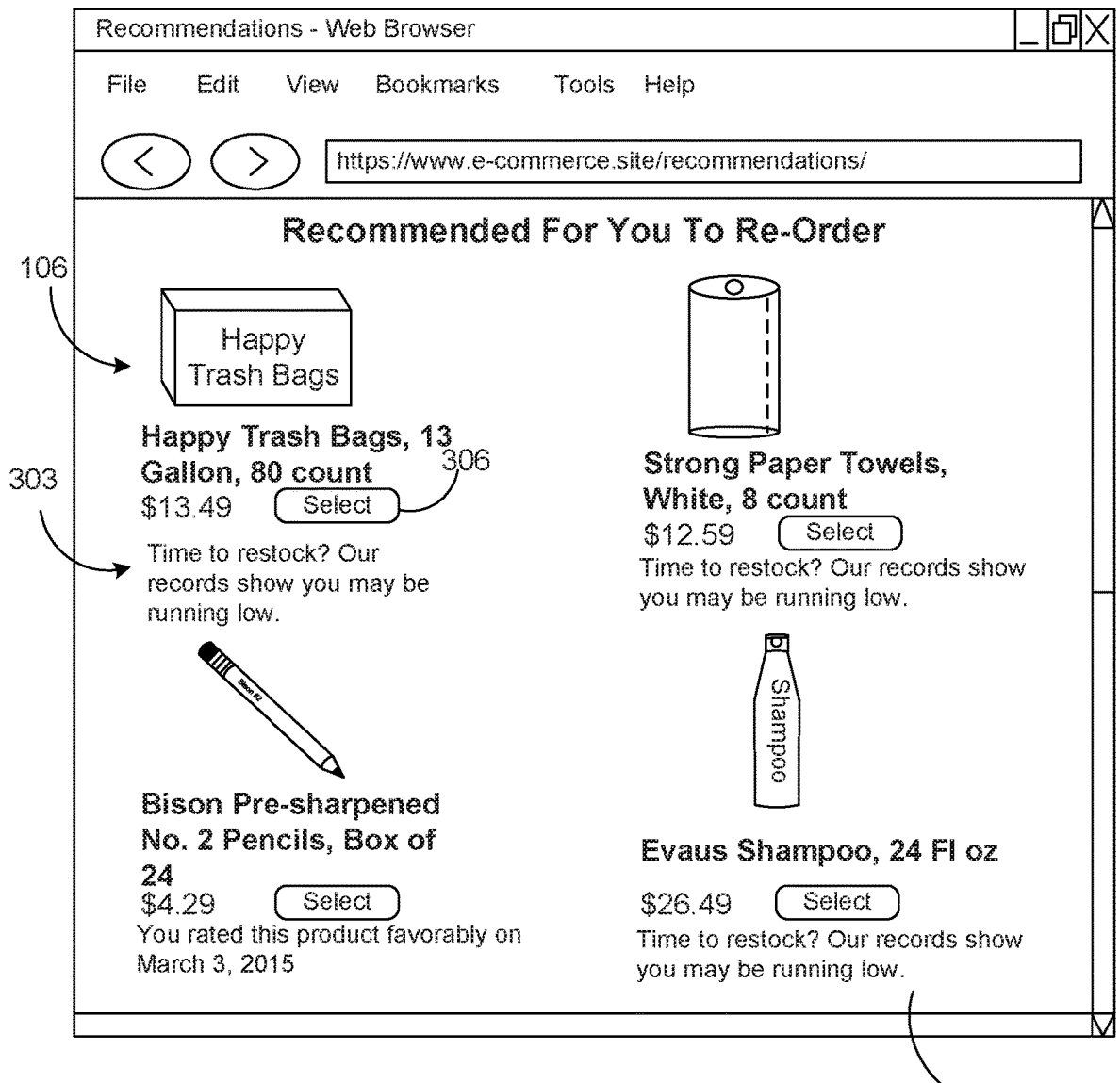
FIG. 3 is a pictorial diagram of an example user interface rendered by a client in the networked environment of FIG. 2 according to various embodiments of the present disclosure.

Referring next to FIG. 3, shown is a pictorial diagram of an example user interface 258a rendered in a client application 255 (FIG. 2) executed in a client device (FIG. 2) in the networked environment 200 (FIG. 2) according to various embodiments of the present disclosure. In particular, the example user interface 258a includes a recommendations network page 300 depicting personalized recommendations of items 106 that have been selected by the item recommendation engine 221 to present to the entity 103 via a rendered user interface 258 in a client application 255. In some non-limiting embodiments, the recommendations network page 300 may further include personalized item 106 information 303 that may include details related to a specific recommendation. For example, the personalized item 106 information 303 for the item 106 "Happy Trash Bags" indicates repeating behavior by the entity 103 with respect to the particular item 106 (e.g., a prediction that a user is likely to want to repurchase the item 106). The recommendation network page 300 may include a selectable component 306 that, upon selection, may request an item detail page associated with the recommended item 106 to initiate the order process by requesting an order of the item 106, and/or other appropriate action.

Figure 4A:
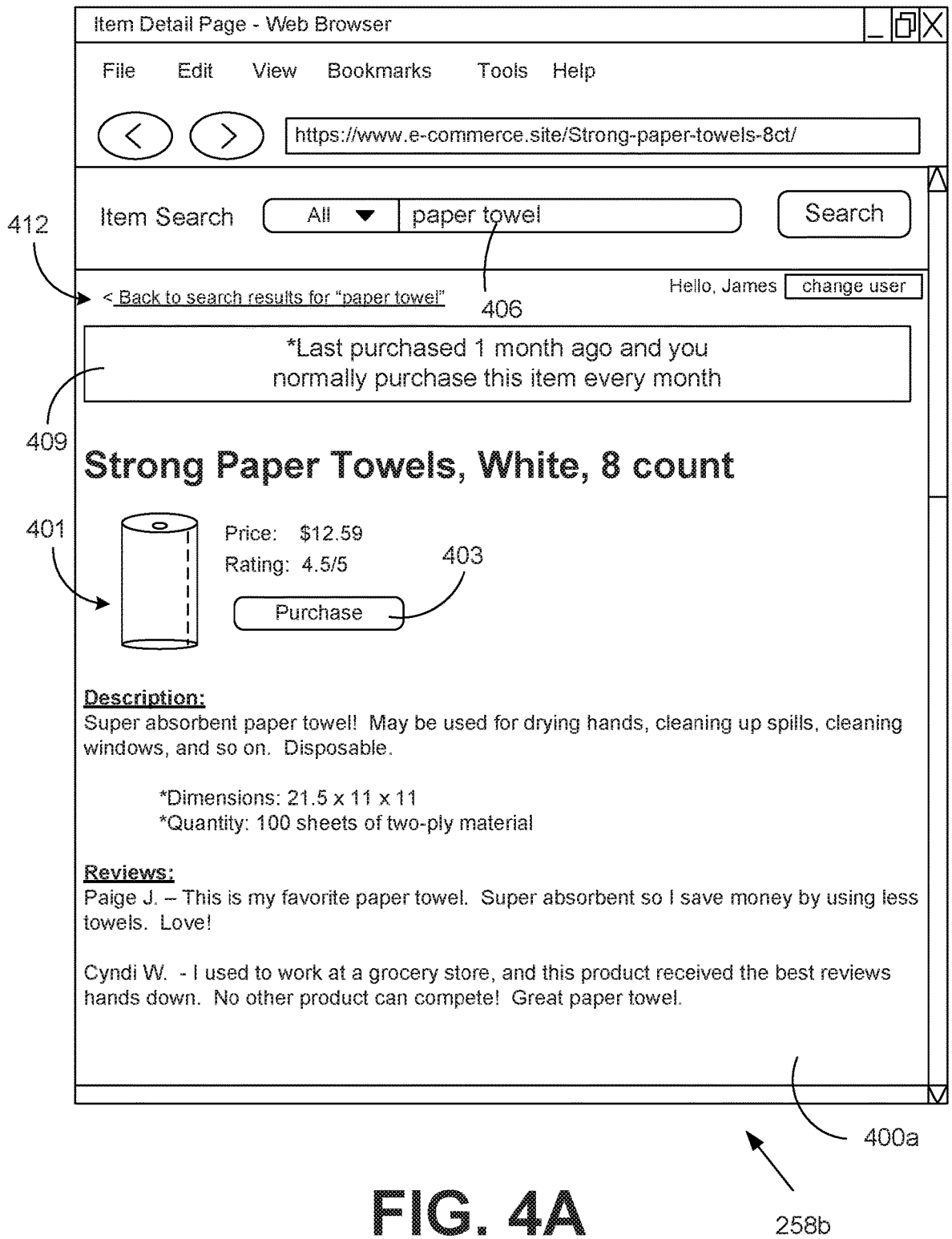
FIGS. 4A, 4B, and 4C are pictorial diagrams of example user interfaces rendered by a client in the networked environment of FIG. 2 according to various embodiments of the present disclosure.

Turning now to FIG. 4A, shown is a pictorial diagram of an example user interface 258b rendered in a client application 255 (FIG. 2) executed in a client device 206 (FIG. 2) in the networked environment 200 (FIG. 2) according to various embodiments of the present disclosure. In particular, the example user interface 258b includes an item detail page 400a presented in response to a search query 406. Specifically, the entity 103 has been redirected to the item detail page 400a instead of an originally requested search results page. The item detail page 400a includes information about a particular item 106 that has been selected according to a prediction and/or a contractual agreement associated with the search query. The item detail page 400a may include an item 106 image 401 and a purchase component 403 as well as additional item detail information associated with the item 106. In some embodiments, the item detail page 400a may include personalized information 409 that emphasizes that a relevant interval of time has passed since the customer last purchased the item 106. For example, the personalized information 409 of FIG. 4A indicates that the entity 103 previously purchased the item 106 last month and normally purchases the item 106 every month. The item detail page 400a further includes a selectable search results component 412. As such, if the entity 103 wants to review the search results, the entity 103 may select the selectable search results component 412 requesting to view a search results page associated with the search query 406.

Figure 4B:
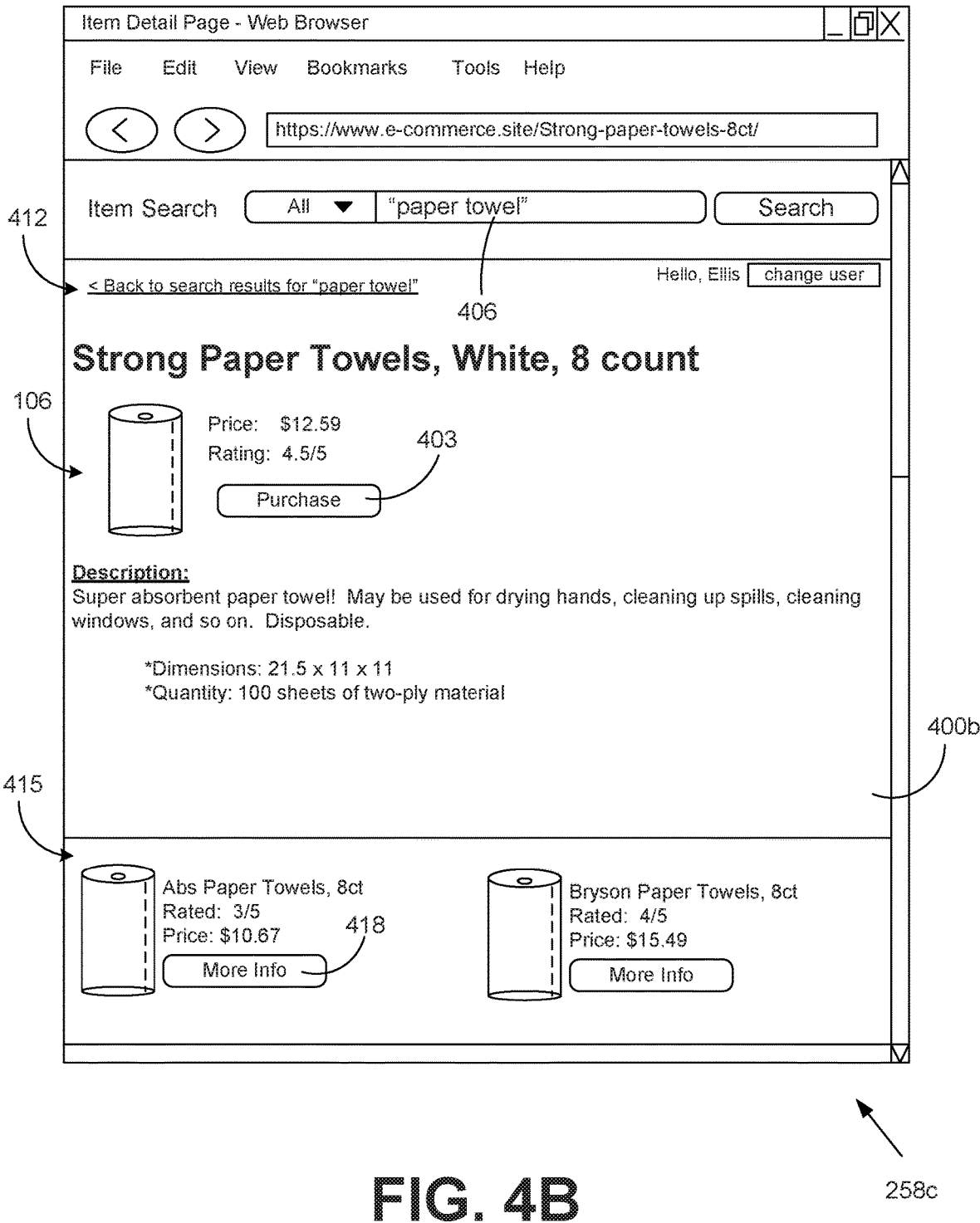

Moving on to FIG. 4B, shown is a pictorial diagram of an example user interface 258c rendered in a client application 255 (FIG. 2) executed in a client device 206 (FIG. 2) in the networked environment 200 (FIG. 2) according to various embodiments of the present disclosure. In particular, the example user interface 258c includes a hybrid search item detail page 400b presented in response to a search query 406. Specifically, the entity 103 has been redirected to the hybrid search item detail page 400b instead of an originally requested search results page.

A first portion of the hybrid search item detail page 400b includes information about a particular item 106 that has been selected according to a prediction and/or a contractual agreement associated with the search query. A second portion of the hybrid search item detail page 400b may include at least a portion of search results 415 associated with the search query 406. The first portion of the hybrid search item detail page 400b may include detailed information specific to the particular item 106, a purchase component 403, and other information/components. In addition, the second portion of the hybrid search item detail page 400b may include an additional information component 418 for each item 106 presented in the search results 415. Upon selection of the additional information component 418, the electronic commerce application 218 may receive a request for an item detail page associated with the corresponding item 106 presented in the second portion of the hybrid search item detail page 400b.

The hybrid search item detail page 400b includes a selectable search results component 412. As such, if the entity 103 wants to review the search results, the entity 103 may select the selectable search results component 412 requesting to view a search results page associated with the search query 406. Upon selection of the selectable search results component 412, the electronic commerce application 218 may receive the request for the search results page.

Figure 4C:
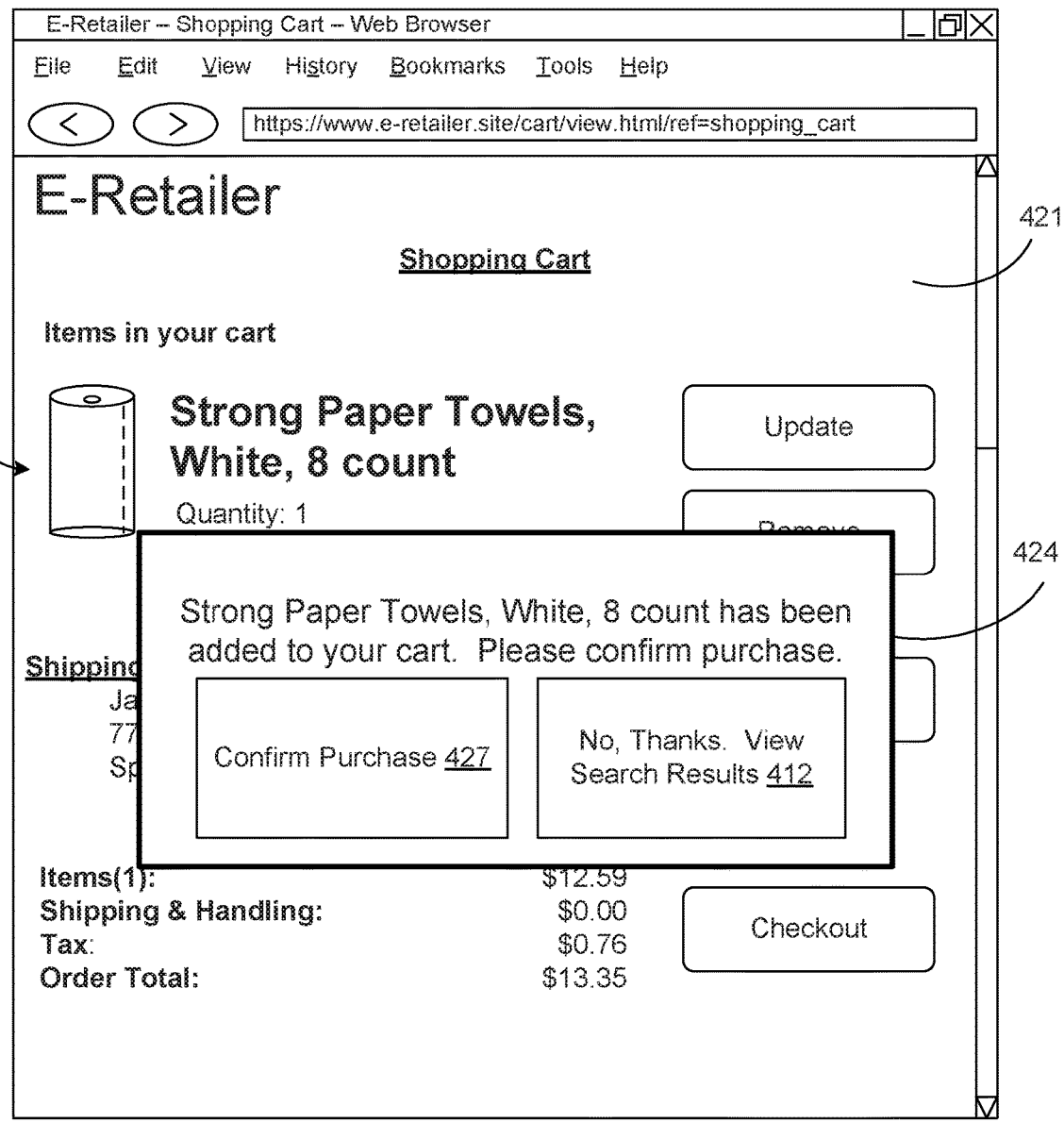

Turning now to FIG. 4C, shown is a pictorial diagram of an example user interface 258d rendered in a client application 255 (FIG. 2) executed in a client device 206 (FIG. 2) in the networked environment 200 (FIG. 2) according to various embodiments of the present disclosure. In particular, the example user interface 258d includes a shopping cart page 421 presented in response to a search query 406 and indicating that a particular item 106 has been automatically added to the shopping cart associated with the electronic commerce application 218. The example user interface 258d further includes a dialog box 424 requesting confirmation of the addition of the item 106 to the shopping cart for ordering. The dialog box 424 may include a confirmation component 427, a selectable search component 412, and/or any other component. Selection of the confirmation component 427 indicates approval of the addition of the item 106 to the shopping cart. Selection of the selectable search component 412 indicates a request for network content including the originally requested search results.

Figure 5A:
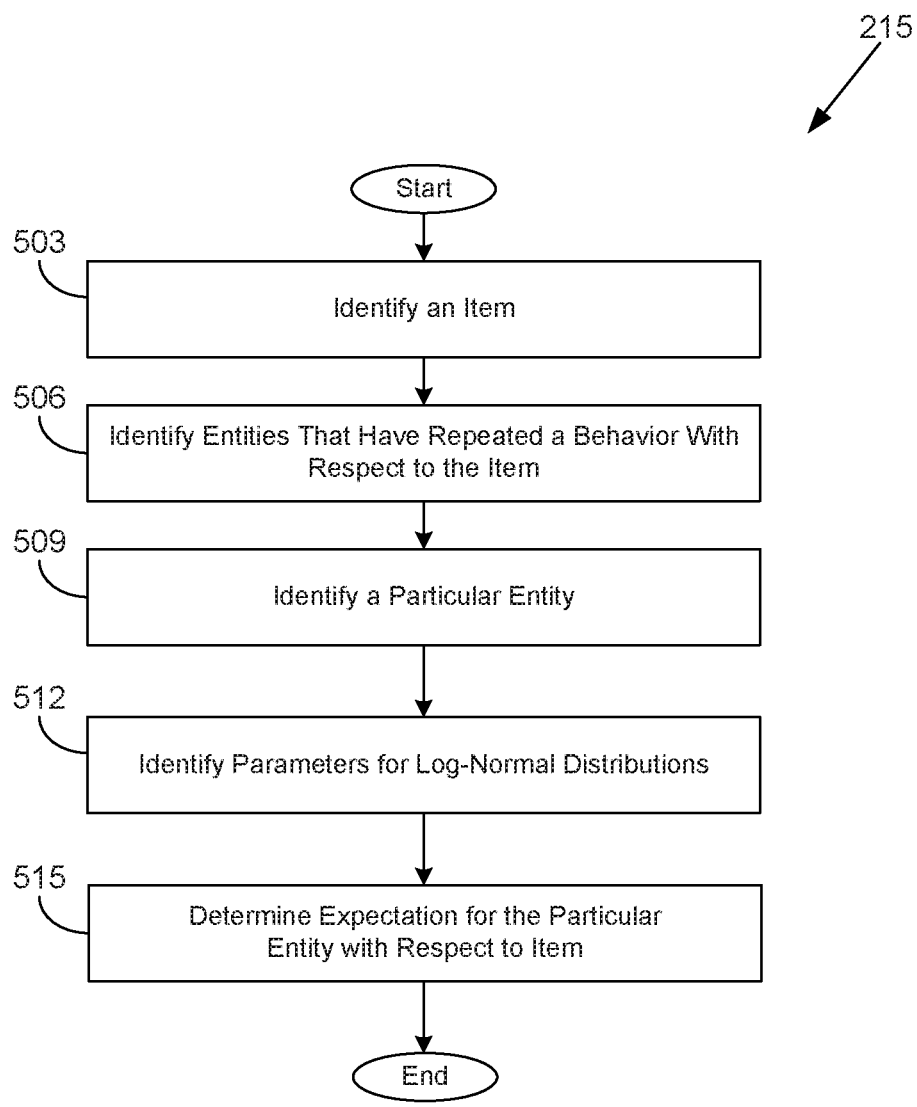
FIG. 5A is a flowchart illustrating one example of functionality implemented as portions of a repeat behavior estimator executed in a computing environment in the networked environment of FIG. 2 according to various embodiments of the present disclosure.

Referring next to FIG. 5A, shown is a flowchart that provides one example of the operation of a portion of the repeat behavior estimator 215 according to various embodiments. It is understood that the flowchart of FIG. 5A provides merely an example of the many different types of functional arrangements that may be employed to implement the operation of the portion of the repeat behavior estimator 215 as described herein. As an alternative, the flowchart of FIG. 5A may be viewed as depicting an example of elements of a method implemented in the computing environment 203 (FIG. 2) according to one or more embodiments.

Beginning with box 503, the repeat behavior estimator 215 may identify an item 106 (FIG. 1). In some embodiments, the item 106 may be identified according to a periodic review of the item catalog 230 (FIG. 2). For example, the repeat behavior estimator 215 may periodically parse through the item catalog 230 to identify items 106 within the catalog. In some embodiments, the repeat behavior estimator 215 may receive a request from the item recommendation engine 221 (FIG. 2), the electronic commerce application 218 (FIG. 2), and/or the search application 224 (FIG. 2). For example, the item recommendation engine 221 may request an expectation of repeat behavior for a specific item 106 that is identified in the request prior to determining which item 106 to recommend. In some embodiments, an update to item 106 data 251 (FIG. 2) may trigger the repeat behavior estimator 215 to determine an expectation of user behavior.

Proceeding to box 506, the repeat behavior estimator 215 may identify one or more entities 103 from the entity data 227 (FIG. 2) that have exhibited repeat behavior (e.g., a purchase) with respect to the identified item 106. For example, the repeat behavior estimator 215 may parse through the entity data 227 (e.g., purchase history) identifying entities 103 (FIG. 1) that have repeated a behavior with respect to the item 106.

Proceeding to box 509, the repeat behavior estimator 215 identifies a particular entity 103. In some embodiments, the repeat behavior estimator 215 may analyze each of the identified entities 103 that have been identified as repeating the behavior with respect to the item 106 and calculate the expectation of repeat behavior associated with the item 106 for each entity 103. As such, the particular entity 103 is identified as the repeat behavior estimator 215 parses through the entities 103. In some embodiments, a request for the expectation of repeat behavior from the electronic commerce application 218, the item recommendation engine 221, and/or the search application 224 may include the particular entity 103. As such, the repeat behavior estimator 215 may identify the particular entity 103 through the request. For example, upon detection of the particular entity 103 interacting with the electronic marketplace, the electronic commerce application 218 may send a request to the repeat behavior estimator 215 requesting an expectation of repeat behavior by the entity 103 for one or more items 106.

Moving on to box 512, the repeat behavior estimator 215 may estimate the parameters (e.g., location $\mu$, scale $\sigma$, etc.) for one or more Log-Normal Distributions that model the likelihood or probability that an entity 103 will engage in a repeat occurrence of the behavior. For example, the repeat behavior estimator 215 may fit a first Log-Normal Distribution representing a likelihood or probability that an arbitrary entity 103 would engage in a repeat occurrence of a behavior to interoccurence time intervals 248 of all entities 103 for a given behavior. The location $\mu_p$, scale $\sigma_p$, and other parameters of the first Log-Normal distribution can then be estimated. If the entity 103 has engaged in the behavior two or fewer times, the first Log-Normal Distribution may serve as the basis for predicting the likelihood or probability that the entity 103 will repeat the behavior after a given period of time has elapsed since the last occurrence of the behavior.

However, if the entity 103 has engaged in the behavior on more than two occasions, then a second Log-Normal Distribution can be fitted to the interoccurence time intervals 248 stored in the entity data 227 (FIG. 2) for the specific entity 103 that are related to the behavior. The location $\mu_c$, scale $\sigma_c$, and other parameters of the second Log-Normal Distribution can then be estimated. A customized Log-Normal Distribution can then be created to model the likelihood or probability that the entity 103 will repeat the behavior in the future. The customized Log-Normal Distribution the location and scale parameters for the customized Log-Normal Distribution can be determined according to Equation (1).

Referring next to box 515, the repeat behavior estimator 215 may determine the expectation of repeat behavior by the particular entity 103 with respect to the identified item 106 at a given time after a previous occurrence of the behavior by the entity 103. To determine the expectation of repeat behavior by the particular entity 103 with respect to the identified item 106, the repeat behavior estimator 215 may multiply the probability provided by the customized Log-Normal Distribution for the given time after the previous occurrence of the behavior by the REB factor defined by Equation (2). Upon determining the expectation of repeat behavior by the particular entity 103, the previously described portion of the repeat behavior estimator 215 ends.

Figure 5B:
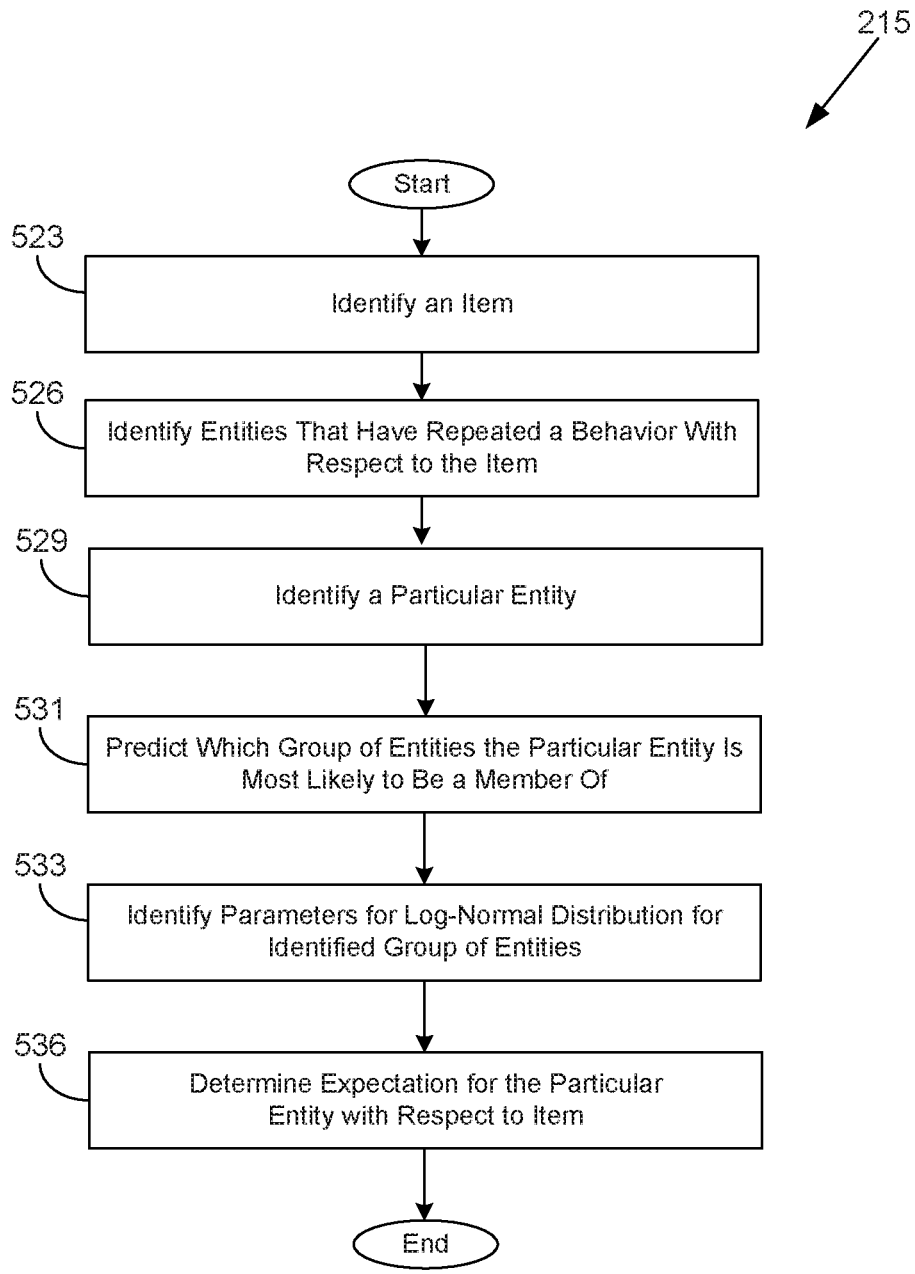
FIG. 5B is a flowchart illustrating one example of functionality implemented as portions of a repeat behavior estimator executed in a computing environment in the networked environment of FIG. 2 according to various embodiments of the present disclosure.

Referring next to FIG. 5B, shown is a flowchart that provides one example of the operation of a portion of the repeat behavior estimator 215 according to various embodiments. It is understood that the flowchart of FIG. 5B provides merely an example of the many different types of functional arrangements that may be employed to implement the operation of the portion of the repeat behavior estimator 215 as described herein. As an alternative, the flowchart of FIG. 5B may be viewed as depicting an example of elements of a method implemented in the computing environment 203 (FIG. 2) according to one or more embodiments.

Beginning with box 523, the repeat behavior estimator 215 may identify an item 106 (FIG. 1). In some embodiments, the item 106 may be identified according to a periodic review of the item catalog 230 (FIG. 2). For example, the repeat behavior estimator 215 may periodically parse through the item catalog 230 to identify items 106 within the catalog. In some embodiments, the repeat behavior estimator 215 may receive a request from the item recommendation engine 221 (FIG. 2), the electronic commerce application 218 (FIG. 2), and/or the search application 224 (FIG. 2). For example, the item recommendation engine 221 may request an expectation of repeat behavior for a specific item 106 that is identified in the request prior to determining which item 106 to recommend. In some embodiments, an update to item 106 data 251 (FIG. 2) may trigger the repeat behavior estimator 215 to determine an expectation of user behavior.

Proceeding to box 526, the repeat behavior estimator 215 may identify one or more entities 103 from the entity data 227 (FIG. 2) that have exhibited repeat behavior (e.g., a purchase) with respect to the identified item 106. For example, the repeat behavior estimator 215 may parse through the entity data 227 (e.g., purchase history) identifying entities 103 (FIG. 1) that have repeated a behavior with respect to the item 106.

Proceeding to box 529, the repeat behavior estimator 215 identifies a particular entity 103. In some embodiments, the repeat behavior estimator 215 may analyze each of the identified entities 103 that have been identified as repeating the behavior with respect to the item 106 and calculate the expectation of repeat behavior associated with the item 106 for each entity 103. As such, the particular entity 103 is identified as the repeat behavior estimator 215 parses through the entities 103. In some embodiments, a request for the expectation of repeat behavior from the electronic commerce application 218, the item recommendation engine 221, and/or the search application 224 may include the particular entity 103. As such, the repeat behavior estimator 215 may identify the particular entity 103 through the request. For example, upon detection of the particular entity 103 interacting with the electronic marketplace, the electronic commerce application 218 may send a request to the repeat behavior estimator 215 requesting an expectation of repeat behavior by the entity 103 for one or more items 106.

Referring next to box 531, the repeat behavior estimator 215 predicts which group of entities 103 the identified entity 103 is likely to be a member of and selects an appropriate Log-Normal Distribution based at least in part on the prediction. For example, the repeat behavior estimator 215 may use a Gaussian mixture model to predict the probability that the particular customer is a member of a specific customer demographic based at least in part on the results of equation (3). Each customer demographic may have a corresponding Log-Normal Distribution with different parameter values from the Log-Normal Distributions of other customer demographics. The repeat behavior estimator 215 could therefore determine that whichever customer demographic the customer is most likely to be a member of, based on the results of equation (3), is the customer demographic to which the customer belongs. The repeat behavior estimator 215 could then use the Log-Normal Distribution corresponding to the selected customer demographic to predict the likelihood that the customer will repeat a particular behavior after the passage of a specified period of time.

Moving on to box 533, the repeat behavior estimator 215 may estimate the parameters (e.g., location μ, scale σ, etc.) for the Log-Normal Distribution that models the likelihood or probability that an entity 103 will engage in a repeat occurrence of the behavior. The Log-Normal Distribution for which the parameters are to be estimated may be the Log-Normal Distribution corresponding to the entities 103 in the group of entities 103 previously identified in box 531. For example, the repeat behavior estimator 215 may fit a first Log-Normal Distribution representing a likelihood or probability that an arbitrary entity 103 in the identified group of entities 103 would engage in a repeat occurrence of a behavior to interoccurrence time intervals 248 of all entities 103 within the identified group of entities 103 for a given behavior. The location $\mu_p$, scale $\sigma_p$, and other parameters of this first Log-Normal distribution can then be estimated. If the entity 103 has engaged in the behavior two or fewer times, the first Log-Normal Distribution may serve as the basis for predicting the likelihood or probability that the entity 103 will repeat the behavior after a given period of time has elapsed since the last occurrence of the behavior.

However, if the entity 103 has engaged in the behavior on more than two occasions, then a second Log-Normal Distribution can be fitted to the interoccurrence time intervals 248 stored in the entity data 227 (FIG. 2) for the specific entity 103 that are related to the behavior. The location $\mu_c$, scale $\sigma_c$, and other parameters of the second Log-Normal Distribution can then be estimated. A customized Log-Normal Distribution can then be created to model the likelihood or probability that the entity 103 will repeat the behavior in the future. The customized Log-Normal Distribution the location and scale parameters for the customized Log-Normal Distribution can be determined according to Equation (1).

Referring next to box 536, the repeat behavior estimator 215 may determine the expectation of repeat behavior by the particular entity 103 with respect to the identified item 106 at a given time after a previous occurrence of the behavior by the entity 103. To determine the expectation of repeat behavior by the particular entity 103 with respect to the identified item 106, the repeat behavior estimator 215 may multiply the probability provided by the customized Log-Normal Distribution for the given time after the previous occurrence of the behavior by the REB factor defined by Equation (2). Upon determining the expectation of repeat behavior by the particular entity 103, the previously described portion of the repeat behavior estimator 215 ends.

Figure 6:
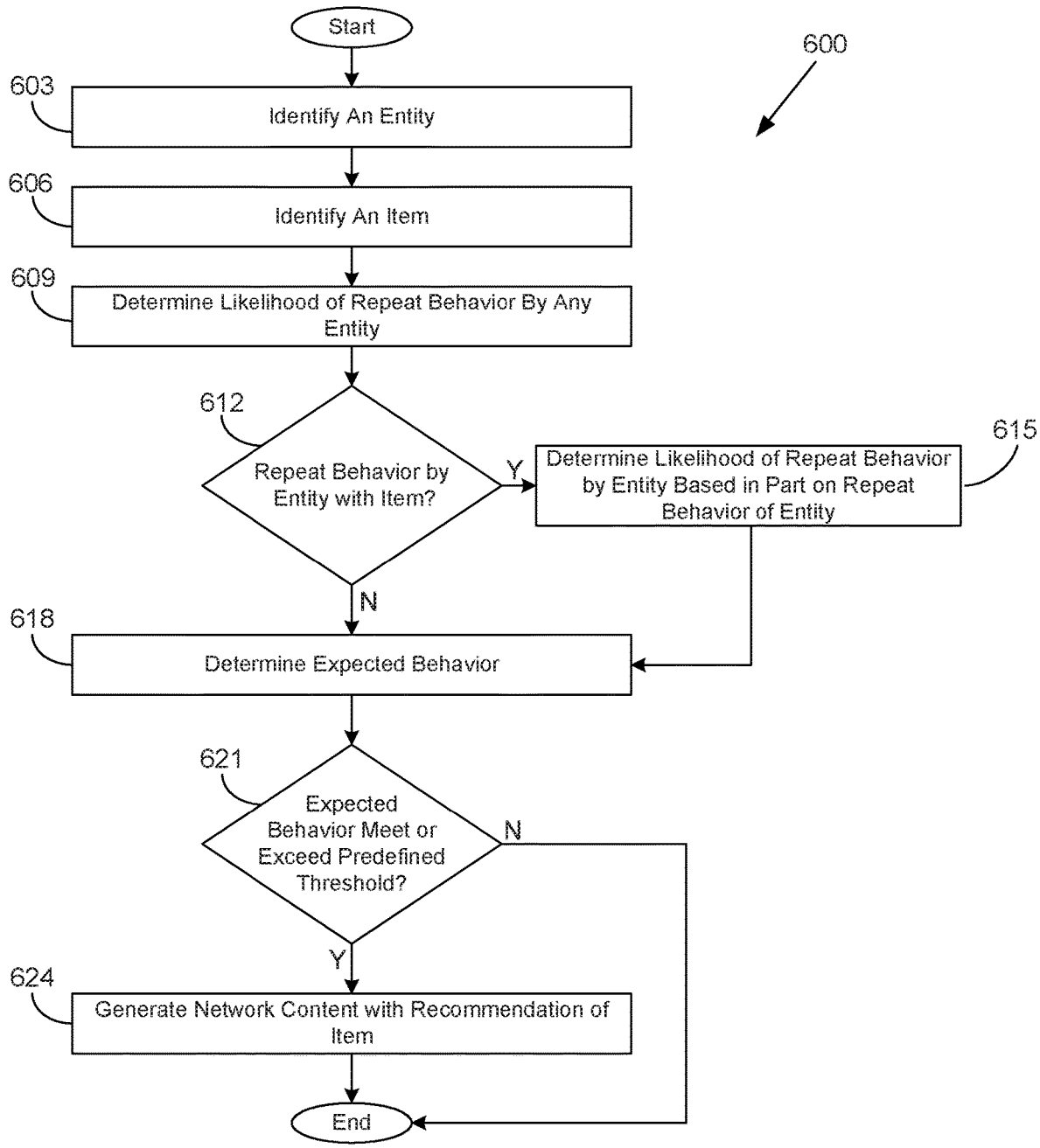
FIG. 6 is a flowchart illustrating one example of functionality implemented as portions of a repeat behavior estimator and an item recommendation engine executed in a computing environment in the networked environment of FIG. 2 according to various embodiments of the present disclosure.

Referring next to FIG. 6, shown is a flowchart 600 that provides one example of the operation of portions of the repeat behavior estimator 215 (FIG. 2) and the item recommendation engine 221 (FIG. 2) according to various embodiments. It is understood that the flowchart of FIG. 6 provides merely an example of the many different types of functional arrangements that may be employed to implement the operation of the portions of the repeat behavior estimator 215 and the item recommendation engine 221 as described herein. As an alternative, the flowchart 600 of FIG. 6 may be viewed as depicting an example of elements of a method implemented in the computing environment 203 (FIG. 2) according to one or more embodiments.

Beginning with box 603, the repeat behavior estimator 215 identifies an entity 103. In some embodiments, the repeat behavior estimator 215 may parse through the identified accounts and calculate the expectation of repeat behavior associated with the item 106 for each entity 103 associated with the accounts. As such, the entity 103 is identified as the repeat behavior estimator 215 parses through each account. In some embodiments, a request for the expectation of repeat behavior from the electronic commerce application 218 (FIG. 2), the item recommendation engine 221, and/or the search application 224 (FIG. 2) may include a particular entity 103 (FIG. 1). As such, the repeat behavior estimator 215 may identify the entity 103 through the request. For example, upon detection of a particular entity 103 interacting with the electronic marketplace, the electronic commerce application 218 may send a request to the repeat behavior estimator 215 requesting an expectation of repeat behavior by the entity 103 for one or more items 106 (FIG. 1). In another non-limiting example, the item recommendations engine 221 may send a request to the repeat behavior estimator 215 that includes identification of the entity 103.

In box 606, the repeat behavior estimator 215 identifies an item 106. In some embodiments, the item 106 may be identified in a request for an expectation of repeat behavior from an electronic commerce application 218, the item recommendation engine 221, and/or the search application 224. In other embodiments, the item 106 may be identified based at least in part on one or more factors associated with the entity 103. The one or more factors may include, for example, the interoccurrence time intervals 248, the item interoccurrence time interval 252 (FIG. 2), the interaction history (e.g., purchasing history, browsing history, rating history, etc.), preference data 245 (FIG. 2), and/or other factors. For example, item 106 may be identified based at least in part on a determined interest in the item 106 according to the one or more factors. In some embodiments, one or more items 106 from the item catalog 230 (FIG. 2) may be assigned a score based at least in part on the one or more factors and the identified item 106 may be based at least in part on a highest ranked score, whether the score meets or exceeds a predefined threshold and/or other factor.

In box 609, the repeat behavior estimator 215 determines the likelihood or probability that an entity 103 will repeat the behavior within a given period of time after a prior occurrence of the behavior based at least in part on the repeat behavior of one or more entities 103 that have exhibited repeat behavior associated with the item 106. As such, the repeat behavior estimator 215 may estimate the likelihood or probability of any entity 103 repeating the behavior according to the repeat behavior rate for each entity 103 that has exhibited repeat behavior associated with the item 106.

In box 612, the repeat behavior estimator 215 determines whether the entity 103 has exhibited repeat behavior with respect to the item 106. For example, the repeat behavior estimator 215 may evaluate the interaction history 242 to determine whether the entity 103 has ordered the item 106 more than once. If the repeat behavior estimator 215 determines that the entity 103 has exhibited repeat behavior with respect to the item 106, the repeat behavior estimator 215 proceeds to box 612. Otherwise, the repeat behavior estimator 215 proceeds to box 615.

In box 612, the repeat behavior estimator 215 determines the likelihood or probability that the entity 103 will repeat the behavior within a given period of time after a previous occurrence of the behavior. This likelihood or probability may be based at least in part on interoccurence time intervals 248 (FIG. 2) stored within the entity data 227 associated with the entity 103 for the given behavior. For example, if the behavior is a purchase of an item 106 through the electronic commerce application 218, the interoccurence time intervals 248 may be based at least in part on the time to that when the entity 103 first purchased an item 106, the time that the entity 103 last purchased the item 106, and the time between subsequent or repeated purchases.

In box 618, the repeat behavior estimator 215 determines the expectation of repeat behavior (e.g., the likelihood or probability that the entity 103 will repeat the behavior within a given period of time after a prior instance) by the entity 103 with respect to the item 106. To determine the expectation of repeat behavior by the entity 103 with respect to the identified item 106, the repeat behavior estimator 215 may apply one or more repeat behavior models such as a Log-Normal Distribution or Gaussian mixture model as previously described. Upon determining the expectation of repeat behavior, the repeat behavior estimator 215 may store the expectation in a database associated with the entity data 227, the item catalog 230, and/or other suitable location. In other embodiments, the repeat behavior estimator 215 may send the expectation of repeat behavior to the item recommendation engine 221, the electronic commerce application 218, and/or the search application 224 in response to a request for the expectation of repeat behavior by the entity 103 with respect to the item 106.

In box 621, the item recommendation engine 221 determines whether the expectation of repeat behavior meets or exceeds a predefined threshold. If the expectation of repeat behavior meets or exceeds the predefined threshold, the item recommendation engine 221 proceeds to box 624. Otherwise, the portions of the item recommendation engine 221 and repeat behavior estimator 215 end.

In box 624, the item recommendation engine 221 generates network content including the recommendation of the item 106. In some embodiments, the item recommendation engine 221 sends the network content to a client device 206, sends the network content to the electronic commerce application 218, stores the network content in a data store 225, and/or other performs another action. After the item recommendation engine 221 generates the network content, the portions of the item recommendation engine 221 and repeat behavior estimator 215 end.

Figure 7:
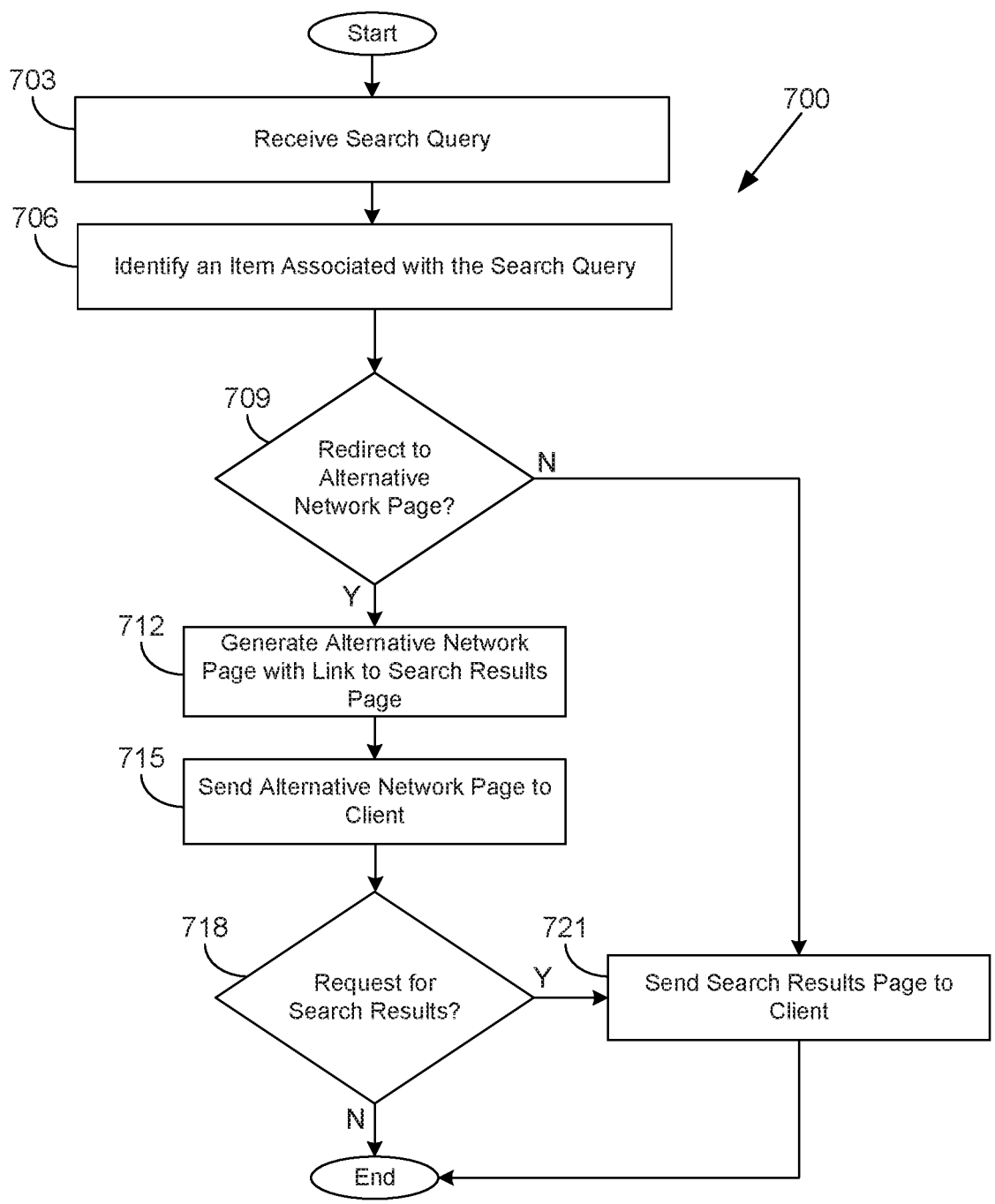
FIGS. 7 and 8 are flowcharts illustrating examples of functionality implemented as portions of an electronic commerce application and a search application executed in a computing environment in the networked environment of FIG. 2 according to various embodiments of the present disclosure.

Referring next to FIG. 7, shown is a flowchart 700 that provides one example of the operation of portions of the search application 224 (FIG. 2) and the electronic commerce application 218 according to various embodiments. It is understood that the flowchart of FIG. 7 provides merely an example of the many different types of functional arrangements that may be employed to implement the operation of the portions of the search application 224 and the electronic commerce application 218 (FIG. 2) as described herein. As an alternative, the flowchart of FIG. 7 may be viewed as depicting an example of elements of a method implemented in the computing environment 203 (FIG. 2) according to one or more embodiments.

Beginning with box 703, the search application 224 receives a search query 406. In some embodiments, the search application 224 receives a search query 406 (FIGS. 4A and 4B) directly from a client device 206 (FIG. 2) in response to the search query 406 being submitted via a search query component (e.g., text box, audio input component, etc.) on a network page associated with the electronic commerce application 218 rendered in the client device 206 (FIG. 2). In other embodiments, the search application 224 receives the search query 406 from the electronic commerce application 218 in response to the electronic commerce application 218 receiving the search query from a client device 206.

In box 706, the search application 224 identifies an item 106 (FIG. 1) associated with the search query 406. In some embodiments, the item 106 may be identified from search results generated by the search application 224 in response to receiving the search query. In other embodiments, the item 106 may be identified based at least in part on relevance to the search query, keywords matching all or part of the search query, and one or more factors. The one or more factors may include, for example, terms of a contractual agreement, previous results from a similar search query associated with the entity 103 (FIG. 1), entity data 227 (FIG. 2), preference data 245 (FIG. 2), and/or other factors. For example, a contractual agreement may specify a specific item 106 with respect to a particular search query. In another non-limiting example, an item 106 may be identified in part on behavior associated with a previous presentation of search results following a similar search query (e.g., selection and purchase of an item 106 in prior search results).

In box 709, the search application 224 determines whether to redirect the entity 103 to alternative network content specific to the item 106 instead of network content including the originally requested search results. In some embodiments, the search application 224 may be able to predict the particular result (e.g., item 106) that the entity 103 is interested in based at least in part on the search query and/or a variety of other factors. The factors may include, for example, repeated behavior by the entity 103 with respect to an item 106, a likelihood or probability that the entity 103 will repeat the behavior with respect to the item 106, preference data 245, interaction history 242, specificity of the search query (e.g., brand name of item 106 included), relationship to prior purchases, and so on. The factors may be evaluated in order to determine a level of confidence regarding whether a particular item 106 is the desired result of the entity 103 requesting search results. For example, the factors may be assigned a score based at least in part on a sum of weighted values. If the score meets or exceeds a predefined threshold, the search application 224 may determine to redirect the entity 103 to an alternative network page or content associated with the particular item 106 rather than the originally requested search results associated with the search query 406.

For example, in some embodiments, the search application 224 may determine to redirect the entity 103 to the item detail page 400a, 400b (FIGS. 4A and 4B) of the particular item 106 rather than the search results page including search results associated with the search query 406. In other embodiments, the search application 224 may determine to redirect the entity 103 to shopping cart network content 421 (FIG. 4C) indicating that the item 106 has been added to the shopping cart. The network content may include a dialog box 424 (FIG. 4C) requesting a confirmation for the addition of the item 106 to the shopping cart. The dialog box 424 may further include a search results component 412 that, when selected, requests network content including the originally requested search results.

In other embodiments, the search application 224 may determine that alternative network content associated with a particular item 106 should be generated in response to a search query instead of a search results page based at least in part on a contractual agreement between a merchant and/or vendor associated with the item 106 and the electronic marketplace. For example, the merchant data 236 and/or the redirect rules 239 may indicate that if a certain search query is received (e.g., "paper towels") that alternative network content (e.g., item detail page, shopping cart network page with item 106 automatically added, etc.) associated with an item 106 of the merchant should be provided instead of search results corresponding to the search query.

If the search application 224 determines that the entity 103 should be redirected to the alternative network content instead of the originally requested search results, the flowchart 700 proceeds to box 712. Otherwise, the flowchart 700 proceeds to box 721.

In box 712, alternative network content is generated for the item 106 and includes a selectable search results component 412 that, when selected, requests the search results page associated with the search query 406. In some embodiments, the alternative network content may be generated by the search application 224. In other embodiments, the search application 224 may send a request to the electronic commerce application 218 instructing the electronic commerce application 218 to generate the alternative network content associated with the item 106. In box 715, the alternative network content is sent to the client device 206 in response to the request for the search results associated with the search query. In box 718, the electronic commerce application 218 determines whether a request for the search results following the rendering of the alternative network content has been received. If a request for the search results is received, the flowchart 700 proceeds to box 721. Otherwise, the flowchart 700 ends. In box 721, a search results page is generated including search results from the search query 406 and the search results page is sent to the client device 206. In response to sending the search results page to the client device 206, the flowchart 700 ends.

Figure 8:
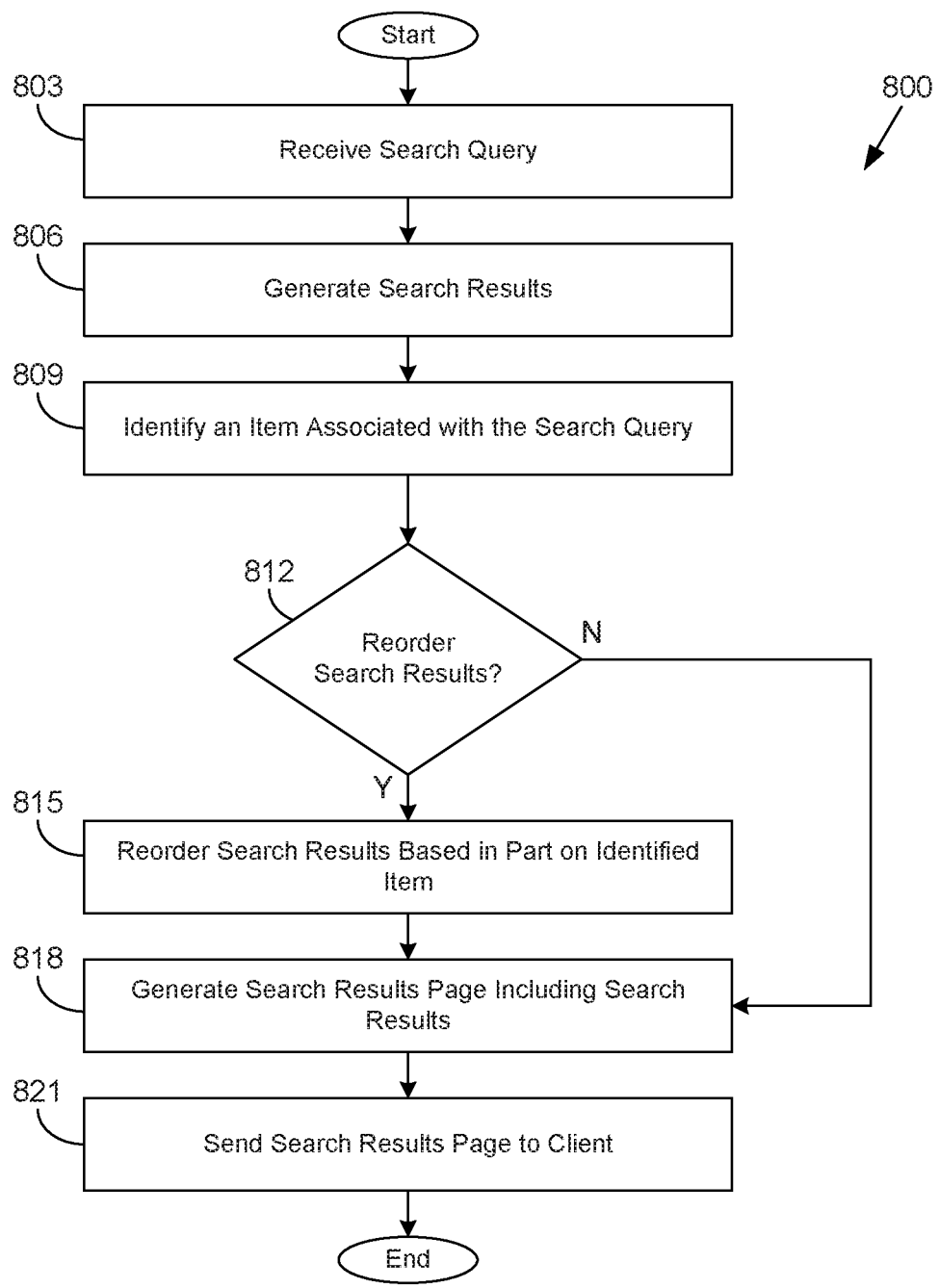

Referring next to FIG. 8, shown is a flowchart 800 that provides one example of the operation of portions of the search application 224 (FIG. 2) and the electronic commerce application 218 (FIG. 2) according to various embodiments. It is understood that the flowchart of FIG. 8 provides merely an example of the many different types of functional arrangements that may be employed to implement the operation of the portion of the search application 224 and the electronic commerce application 218 as described herein. As an alternative, the flowchart 800 of FIG. 8 may be viewed as depicting an example of elements of a method implemented in the computing environment 203 (FIG. 2) according to one or more embodiments.

Beginning with box 803, the search application 224 receives a search query 406 (FIGS. 4A and 4B). In some embodiments, the search application 224 receives a search query 406 directly from a client device 206 (FIG. 2) in response to the search query 406 being submitted via a search query component (e.g., text box, audio input component, etc.) on a network page associated with the electronic commerce application 218 rendered in the client device 206. In other embodiments, the search application 224 receives the search query 406 from the electronic commerce application 218 in response to the electronic commerce application 218 receiving the search query from a client device 206.

In box 806, electronic commerce application 218 may request the search application 224 to generate search results associated with the search query 406. Accordingly, the search application 224 may generate search results according to the search query. In some embodiments, the search application 224 may generate the search results based at least in part of an evaluation of the item catalog 230 (FIG. 2) and/or other data accessible via the computing environment 203. In other embodiments, the search application 224 may request search results from a third-party search engine capable of generating search results by accessing and mining data associated with databases independent of the computing environment 203. In some embodiments, the search results are further based at least in part on the entity data 227 (FIG. 2) and/or other information. In other embodiments, the search results may be retrieved from cached search results that were previously generated from a same and/or similar search query 406.

In box 809, the search application 224 identifies an item 106 (FIG. 1) associated with the search query 406. In some embodiments, the item 106 may be identified from search results generated by the search application 224 in response to receiving the search query. In other embodiments, the item 106 may be identified based at least in part on the search query and one or more factors. The factors may include, for example, terms of a contractual agreement, previous results from a similar search query associated with the entity 103, entity data 227, preference data 245 (FIG. 2), and/or other factors. For example, a contractual agreement may specify a specific item 106 with respect to a particular search query. In another non-limiting example, an item 106 may be identified in part on behavior associated with a previous presentation of search results following a similar search query (e.g., selection and purchase of an item 106 in prior search results).

In box 812, the search application 224 determines whether to reorder the search results. The search application 224 may evaluate one or more factors including, user data, expectation of repeat behavior, terms of a contractual agreement, and/or other factors to determine whether to reorder the search results. For example, an evaluation of the entity data 227 may indicate an interest and/or preference for a particular item 106. Accordingly, if a level of confidence meets or exceeds a predefined threshold, the search application 224 may determine to reorder the search results so that the item 106 is included at and/or near the top of the list when presented to the entity 103 via a search results page rendered in the client device 206. In other embodiments, a contractual agreement may indicate that, for a particular search query, a particular item 106 should be listed at or near the top of the search results. If the search application 224 determines that the search results should be reordered, the flowchart 800 proceeds to box 815. Otherwise, the flowchart 800 proceeds to box 818.

In box 815, the search application reorders the search results based at least in part on the identified item 106. In some embodiments, the search application 224 may rank the expectation of repeat behavior for each item 106 in the search results and reorder the search results according to the ranking. In other embodiments, the search application 224 may evaluate multiple factors and assign a score to each item 106 in the search results based at least in part on the evaluation. The factors may include, for example, an expectation of a repeated occurrence of a behavior, user preference, interaction history 242, contractual agreements, prior behavior with respect to similar searches and/or other factors. The scores may be assigned based on a sum of weighted values for each evaluated factor. The scores may be ranked and the search results may be reordered according to the ranking.

In other embodiments, the search application 224 may reorder the search results according to a contractual agreement between a merchant and/or vendor and the electronic marketplace. For example, the search application 224 may reorder the search results so that a particular item 106 is presented at or near the top of the search results listing based at least in part on terms of a contractual agreement. In box 818, the search results page including the search results is generated. In box 821, the search results are sent to the client device 206. Upon sending the search results to the client device 206, the flowchart 800 ends.

Figure 9:
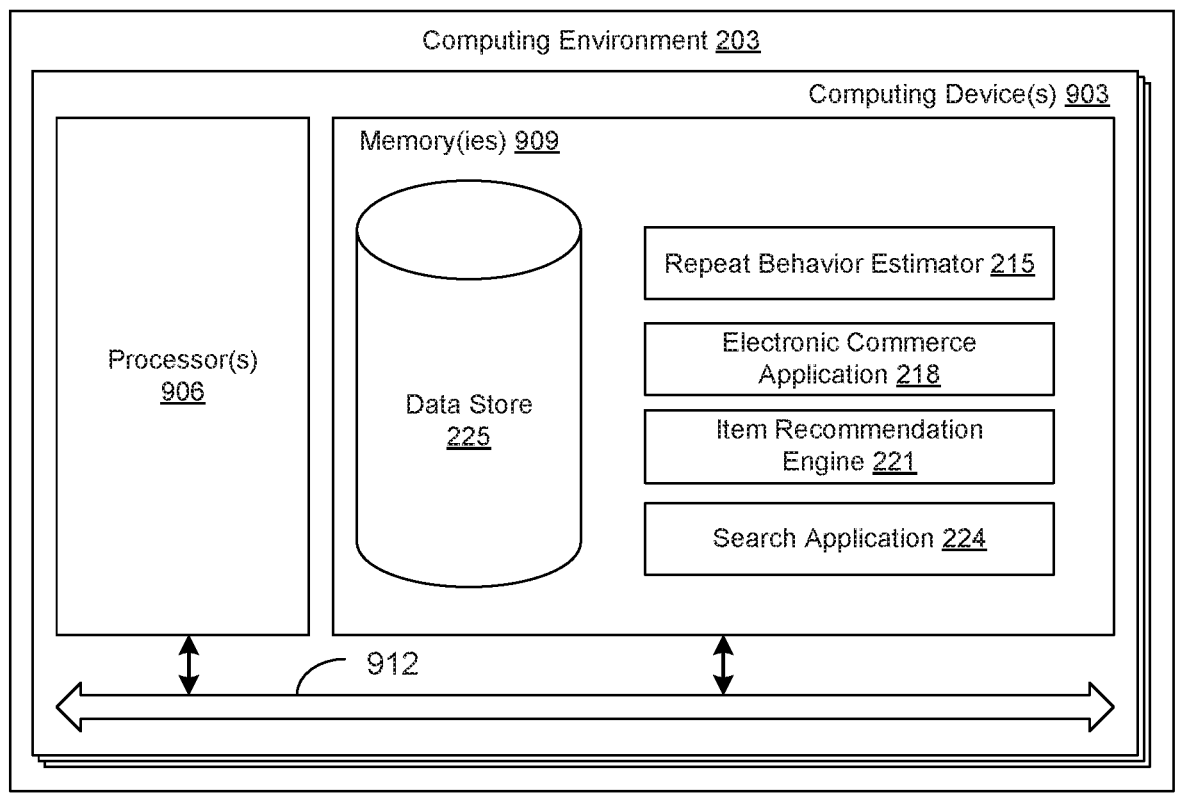
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are a repeat behavior estimator 215, an electronic commerce application 218, an item recommendation engine 221, a search application 224, and potentially other applications. Also stored in the memory 909 may be a data store 225 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the repeat behavior estimator 215, the electronic commerce application 218, the item recommendation engine 221, the search application 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-8 show the functionality and operation of implementations of portions of the repeat behavior estimator 215, the electronic commerce application 218, the item recommendation engine 221, and the search application 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the repeat behavior estimator 215, the electronic commerce application 218, the item recommendation engine 221, and the search application 224, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the repeat behavior estimator 215, the electronic commerce application 218, the item recommendation engine 221, and the search application 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 90 or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine readable instructions stored in the memory that, when executed by the processor, cause the computing device to at least:
   receive a search query from a client device associated with a specific entity;
   identify a plurality of groups of entities, wherein each entity in each of the plurality of groups of entities have repeated a behavior associated with an item;
   identify a specific group of entities in the plurality of groups of entities for which the specific entity is most likely to be a member;
   determine one or more parameters for a Log-Normal distribution based at least in part on a repetition of the behavior by a plurality of entities in the specific group of entities for which the specific entity is most likely to be a member;
   determine an expectation of repeat behavior by the specific entity with respect to the item based at least in part on the one or more parameters for the Log-Normal distribution and a period of time since a prior occurrence of the behavior by the specific entity;
   determine whether to redirect the specific entity from a search results page associated with the search query to alternative network content based at least in part on a score meeting or exceeding a predefined threshold, the score comprising a weighted sum of a plurality of factors, the plurality of factors comprising the expectation of repeat behavior;
   generate the alternative network content comprising an item detail page associated with the item; and
   send the alternative network content to the client device associated with the specific entity.

2. The system of claim 1, wherein the machine readable instructions, when executed by the computing device, further cause the computing device to at least:
- generate a listing of search results associated with the search query in response to a selection of a selectable component in the alternative network content, the listing of search results including the item; and
- send the search results page to the client device associated with the specific entity.

3. The system of claim 1, wherein the item is one of a plurality of items and the machine readable instructions, when executed by the computing device, further cause the computing device to at least rank individual ones of the plurality of items based at least in part on a respective expectation of repeat behavior by the specific entity for the individual ones of the plurality of items, the alternative network content including a highest ranked item of the plurality of items.

4. A method, comprising:
- receiving, via at least one computing device, a search query from a client device associated with a specific entity;
- calculating, via at least one computing device, a respective probability that the specific entity is a member of a particular group of entities in a plurality of groups of entities;
- selecting, via the at least one computing device, a specific group of entities corresponding to a highest respective probability that the specific entity is a member;
- determining, via at least one computing device, an expectation of the specific entity repeating a behavior associated with an item based at least in part on a first time interval between prior occurrences of the behavior by the specific entity and a second time interval between prior occurrences of the behavior by other entities in the specific group of entities;
- selecting, via the at least one computing device, the item from a plurality of items based at least in part on the expectation of the specific entity repeating the behavior;
- determining, via the at least one computing device, whether to redirect the specific entity from a search results page associated with the search query to an alternative network page based at least in part on a score meeting or exceeding a predefined threshold, the score comprising a weighted sum of a plurality of factors, the plurality of factors comprising the expectation of the specific entity repeating the behavior;
- generating, via the at least one computing device, the alternative network page comprising an item detail page associated with the item; and
- sending, via the at least one computing device, the alternative network page to the client device associated with the specific entity.

5. The method of claim 4, wherein the expectation of the specific entity repeating the behavior is based at least in part on a Log-Normal Model associated with the specific group of entities.

6. The method of claim 4, wherein the respective probability that the specific entity is the member of the particular group of entities in the plurality of groups of entities is modeled with a Gaussian mixture model.

7. The method of claim 6, wherein the expectation of the specific entity repeating the behavior is based at least in part on a probability that an entity would repeat the behavior based at least in part on a number of instances that the entity previously engaged in the behavior.

8. The method of claim 7, wherein the probability that the entity would repeat the behavior is modeled as a beta distribution.

9. The method of claim 4, wherein the plurality of factors further comprises at least one of a preference of the specific entity, a type of item, an item category, a price of the item, a number of instances the specific entity has repeated the behavior, or a number of entities that have exhibited the repeat behavior associated with the item.

10. The method of claim 9, further comprising:
- assigning, via the at least one computing device, a respective score to individual ones of the plurality of items based at least in part on the plurality of factors; and
- ranking, via the at least one computing device, the plurality of items according to the respective score.

11. The method of claim 10, wherein the item is selected from the plurality of items based at least in part on being a highest ranked item of the plurality of items.

12. A system comprising,
- a computing device comprising a processor and a memory;
- machine readable instructions stored in the memory that, when executed by the processor, cause the computing device to at least:
  - receive a search query from a client device associated with a specific entity;
  - calculate a respective probability that the specific entity is a member of a particular group of entities in a plurality of groups of entities;
  - select a specific group of entities corresponding to a highest respective probability that the specific entity is a member;
  - determine an expectation of the specific entity repeating a behavior associated with an item based at least in part on a first time interval between prior occurrences of the behavior by the specific entity and a second time interval between prior occurrences of the behavior by other entities in the specific group of entities;
  - select the item from a plurality of items based at least in part on the expectation of the specific entity repeating the behavior;
  - determine whether to redirect the specific entity from a search results page associated with the search query to an alternative network page based at least in part on a score meeting or exceeding a predefined threshold, the score comprising a weighted sum of a plurality of factors, the plurality of factors comprising the expectation of the specific entity repeating the behavior;
  - generate the alternative network page comprising an item detail page associated with the item; and
  - send the alternative network page to the client device associated with the specific entity.

13. The system of claim 12, wherein the expectation of the specific entity repeating the behavior is based at least in part on a Log-Normal Model associated with the specific group of entities.

14. The system of claim 12, wherein the respective probability that the specific entity is the member of the particular group of entities in the plurality of groups of entities is modeled with a Gaussian mixture model.

15. The system of claim 14, wherein the expectation of the specific entity repeating the behavior is based at least in part on a probability that an entity would repeat the behavior based at least in part on a number of instances that the entity previously engaged in the behavior.

16. The system of claim 15, wherein the probability that the entity would repeat the behavior is modeled as a beta distribution.

17. The system of claim 12, wherein the plurality of factors further comprises at least one of a preference of the specific entity, a type of item, an item category, a price of the item, a number of instances the specific entity has repeated the behavior, or a number of entities that have exhibited the repeat behavior associated with the item.

18. The system of claim 17, wherein the machine readable instructions, when executed by the processor, cause the computing device to at least:
  assign a respective score to individual ones of the plurality of items based at least in part on the plurality of factors; and
  rank the plurality of items according to the respective score.

19. The system of claim 18, wherein the item is selected from the plurality of items based at least in part on being a highest ranked item of the plurality of items.

\* \* \* \* \*